(12) United States Patent
Coots

(10) Patent No.: US 9,745,132 B2
(45) Date of Patent: Aug. 29, 2017

(54) TIE PLATE SEPARATOR AND METHOD THEREOF

(71) Applicant: B&B Metals, Inc., Shepherdsville, KY (US)

(72) Inventor: William R. Coots, Lebanon Junction, KY (US)

(73) Assignee: B&B Metals, Inc., Shepherdsville, KY (US)

( * ) Notice: Subject to any disclaimer, the term of this patent is extended or adjusted under 35 U.S.C. 154(b) by 183 days.

(21) Appl. No.: 14/720,800

(22) Filed: May 24, 2015

(65) Prior Publication Data

US 2015/0251851 A1 Sep. 10, 2015

Related U.S. Application Data

(60) Division of application No. 13/657,645, filed on Oct. 22, 2012, now Pat. No. 9,038,542, which is a continuation-in-part of application No. 13/428,796, filed on Mar. 23, 2012, and a continuation-in-part of application No. 13/428,828, filed on Mar. 23, 2012, now Pat. No. 9,422,673, and a continuation-in-part of application No. 13/428,809, filed on Mar. 23, 2012, now Pat. No. 9,016,208.

(51) Int. Cl.
  *B65G 15/12* (2006.01)
  *E01B 29/32* (2006.01)
  *B65G 17/12* (2006.01)

(52) U.S. Cl.
  CPC ............. *B65G 15/12* (2013.01); *B65G 17/12* (2013.01); *E01B 29/32* (2013.01); *Y10T 137/85986* (2015.04)

(58) Field of Classification Search
  CPC .......... E01B 29/02; E01B 29/05; E01B 29/16; E01B 29/17; E01B 29/24; E01B 29/32
  See application file for complete search history.

(56) References Cited

U.S. PATENT DOCUMENTS

| 847,451 A | 3/1907 | Wilmore |
| 1,953,818 A | 4/1934 | Paridon |
| 2,341,265 A | 2/1944 | Crawford |
| 3,063,543 A | 11/1962 | Schneider |
| 3,552,539 A | 1/1971 | Rutter |
| 3,589,531 A | 6/1971 | Povlacs |
| 3,930,595 A | 1/1976 | Formanski |
| 4,583,635 A | 4/1986 | Timmer et al. |
| 5,038,914 A | 8/1991 | Cotic et al. |

(Continued)

FOREIGN PATENT DOCUMENTS

| CA | 2810847 | 9/2013 |
| EP | 0192594 | 7/1989 |

(Continued)

OTHER PUBLICATIONS

Canadian Intellectual Property Office, Office Action for CA Patent App. No. 2,810,688 dated Sep. 28, 2016.
Transmittal Letter of Related Cases, May 17, 2017.

*Primary Examiner* — R. J. McCarry, Jr.
(74) *Attorney, Agent, or Firm* — Middleton Reutlinger

(57) ABSTRACT

Embodiments of a tie plate sorter are disclosed wherein the tie plates are sorted and fed to an output device for further feeding to a tie plate distribution system. The tie plates may be oriented as needed. Exemplary methods are also provided.

8 Claims, 25 Drawing Sheets

(56) References Cited

U.S. PATENT DOCUMENTS

| | | | |
|---|---|---|---|
| 5,165,520 | A | 11/1992 | Herve et al. |
| 5,913,402 | A | 6/1999 | Sakota et al. |
| 6,564,925 | B1 | 5/2003 | Cadwallader et al. |
| 7,665,599 | B2 | 2/2010 | Stibbard |
| 9,016,208 | B2 | 4/2015 | Coots |
| 9,038,542 | B2 | 5/2015 | Coots |
| 9,328,465 | B1 | 5/2016 | Coots |
| 9,422,673 | B2 | 8/2016 | Coots |
| 2004/0094188 | A1* | 5/2004 | Stalp .................. B03B 5/02 134/56 R |
| 2009/0188406 | A1* | 7/2009 | Sperling ............. E01B 29/26 104/307 |
| 2011/0100248 | A1 | 5/2011 | Buckley et al. |
| 2011/0146526 | A1 | 6/2011 | Plyler et al. |

FOREIGN PATENT DOCUMENTS

| | | |
|---|---|---|
| EP | 0895949 A1 | 2/1999 |
| EP | 0895950 | 11/2004 |

* cited by examiner

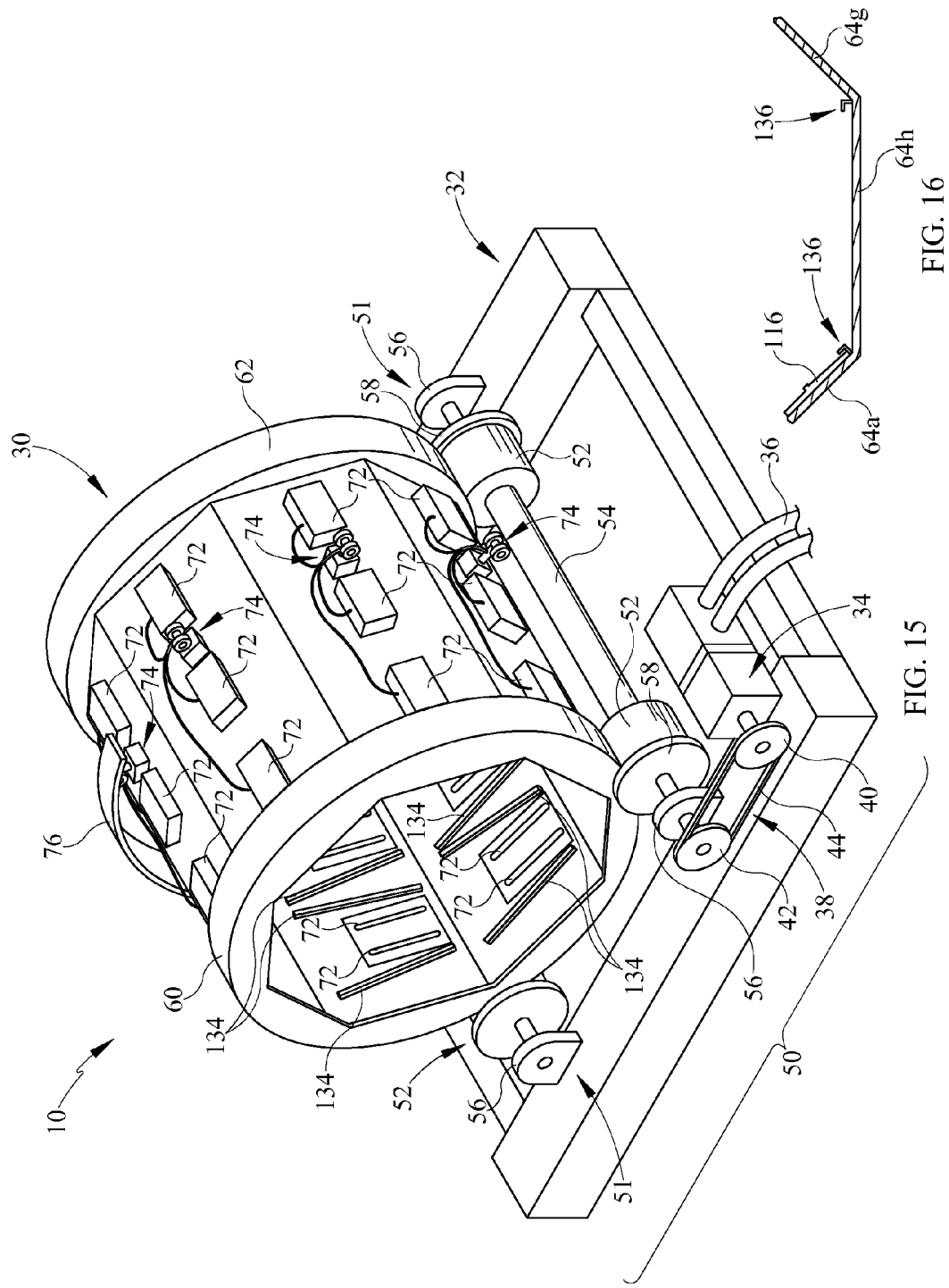

TIE PLATE SEPARATOR AND METHOD THEREOF

CLAIM TO PRIORITY

This divisional application claims priority to and benefit of under 35 U.S.C. §120 continuation-in-part application having U.S. patent application Ser. No. 13/657,645 filed Oct. 22, 2012, entitled Tie Plate Separator and Method Thereof, which claims priority to and benefit of under 35 U.S.C. §120 all of: U.S. patent application Ser. No. 13/428,796, filed Mar. 23, 2012, entitled Tie Plate Separator and Method Thereof, U.S. patent application Ser. No. 13/428,809, filed Mar. 23, 2012, entitled Tie Plate Separator and Method Thereof, and U.S. patent application Ser. No. 13/428,828, filed Mar. 23, 2012, entitled Tie Plate Separator and Method Thereof.

BACKGROUND

1. Field of the Invention

An apparatus and method is taught for separating and sorting tie plates so that the tie plates may be sequentially fed to a tie plate distribution system. More specifically, an apparatus and method are taught for feeding a tie plate distribution system wherein the tie plates are separated and sorted mechanically rather than manually thereby improving efficiency of a tie plate distribution process.

2. Description of the Related Art

In current tie plate distribution systems, sorting and/or separating of tie plates, including orientation of the plates, is a highly manual endeavor. Workers stand along conveyors to lift, rotate and/or orient tie plates for proper feeding location. This typically requires two men on lower output machines and as many as six men on high output or high production machines.

Due to labor costs and a desire to eliminate job functions where lifting or other injuries might occur, it would be desirable to automate as many of these labor positions as possible.

Additionally, it would be desirable to increase the throughput of tie plates to increase efficiencies associated with distribution and therefore decrease the downtime of railroad tracks during maintenance periods when tie plate replacement is necessary.

SUMMARY

According to at least one embodiment, a tie plate sorter assembly comprises at least one generally cylindrical driving ring, at least one tie plate receiving side extending from adjacent the cylindrical driving ring, at least one magnet selectively operable and disposed adjacent the at least one tie plate receiving side, a tie plate input which provides tie plates to the tie plate receiving side when the tie plate receiving side is in one position, a tie plate output which receives sorted tie plates from the tie plate receiving side when the tie plate receiving side is in a second position. Optionally, the at least one generally cylindrical driving ring may have a first cylindrical drive ring and a second cylindrical drive ring. The first and second cylindrical drive rings may be disposed on tires wherein at least one of the tires is rotatably driven. The tie plate sorter assembly wherein the at least one of said tires may be driven by one of an electric or hydraulic motor. The tie plate sorter assembly wherein the one of an electric motor or a hydraulic motor is directly connected to the at least one of the tires. The tie plate sorter assembly wherein the one of an electric motor or a hydraulic motor is connected to the at least one of the tires by a transmission assembly. Optionally, the transmission assembly may be one of a chain drive, a belt drive, a gear drive, or a hydraulic transmission. The tie plate sorter assembly further comprises a chain drive having a drive sprocket extending about said tie plate sorter. The tie plate sorter assembly wherein the at least one tie plate receiving side forms a geometric shape and further wherein the geometric shape may be one of a circle, a polygon, a square, a rectangle, a quadrilateral, a trapezoid, a pentagon, a hexagon, and an octagon. The tie plate sorter assembly wherein each of the at least one tie plate receiving sides including at least one magnet. The tie plate sorter assembly wherein the at least one magnet is selectively powerable. The tie plate sorter assembly further comprises a power supply and a conductor which selectively powers the at least one magnet. The tie plate sorter assembly wherein the power supply is a metallic strip. The tie plate sorter assembly wherein the conductor engages the power supply dependent on a position of the receiver.

According to at least another embodiment, a tie plate sorter assembly for use on a tie plate distribution vehicle capable of operation on-road and on a railroad track, the vehicle having a bed and a crane, comprises a tie plate receiver having a first driving ring and a second driving ring, at least one tie plate receiving side extending between the first driving ring and the second driving ring, the at least one tie plate receiving side substantially forming one of a circle or a polygon, at least one driving assembly causing cyclical motion of said at least one tie plate receiving side, at least one magnet disposed adjacent the at least one tie plate receiving side, said at least one magnet being selectively operable, a tie plate input which delivers tie plates to the tie plate receiver, and, a tie plate output which receives the tie plates from the tie plate receiver. The tie plate sorter assembly wherein the cyclical motion is rotational. The tie plate sorter assembly wherein the cyclical motion is bi-directional. The tie plate sorter assembly wherein the tie plate input enters in a first direction. The tie plate sorter assembly wherein the tie plate output exits in a second direction. The tie plate sorter assembly wherein the first direction and the second direction are linearly aligned. The tie plate sorter assembly wherein the first and second direction are non-aligned. The tie plate sorter assembly further comprises an electrical contact operably engaging the at least one magnet. The tie plate sorter assembly wherein the tie plate input is optionally one of a roller conveyor, a belt conveyor, a chute or a feeder.

According to a further alternative embodiments, a tie plate sorter assembly comprises a drive assembly for cyclical motion of a tie plate receiver, the tie plate receiver having at least one tie plate receiving side, at least one magnet disposed on the tie plate receiver, the magnet disposed selectively operable based upon a position of said at least one magnet, a tie plate input providing tie plates to the tie plate receiver, a tie plate output receiving tie plates from the tie plate receiver. The tie plate sorter assembly wherein the magnet is an electromagnet. The tie plate sorter assembly wherein the magnet is a dual pole bar magnet. The tie plate sorter assembly wherein the at least one magnet has at least one on position and at least one off position during movement of said tie plate receiver. The tie plate sorter assembly further comprising guides located along the at least one tie plate receiving side. The tie plate sorter assembly further comprises a catch disposed on an inside of the tie plate receiver. The tie plate sorter assembly further comprises a power supply to power the at least one magnet.

According to an exemplary embodiment, a method of separating tie plates comprises driving a tie plate receiver in a cyclical manner, receiving tie plates in the tie plate receiver, moving the tie plates from a first position to a second position in the tie plate receiver, selectively releasing the tie plates onto a discharge conveyor, moving the tie plates along the discharge conveyor. The method of separating tie plates wherein the cyclical manner is rotational. The method of separating tie plates further comprises driving the tie plate receiver in at least two directions. The method of separating tie plates further comprises selectively retaining the tie plates. The method of separating tie plates further comprises driving the tie plate receiver with a hydraulic assembly. The method of separating tie plates further comprises driving the tie plate receiver with one of a pneumatic, hydraulic or electric motor. The method of separating tie plates further comprises rotating at least one tire with the at least one hydraulic or electric motor. The method of separating tie plate further comprises receiving the tie plates at a lower position of the tie plate receiver and electromagnetically releasing at least one of the tie plates at a higher position of said tie plate receiver. The method of separating tie plates further comprises actuating an electromagnet between an on condition and an off condition. The method of separating tie plates further comprises changing orientation of the tie plates on a discharge conveyor.

According to a further exemplary embodiment, a method of separating tie plates for feeding to a distribution conveyor comprises driving a tie plate receiver cyclically, feeding a plurality of tie plates to the tie plate receiver, moving the plurality of tie plates from a first position to a second position during the cyclical driving, and, releasing the plurality of tie plates on to an exit conveyor at the second position. The method wherein the feeding occurs with an entrance conveyor. The method further comprises operating the entrance conveyor and the exit conveyor in a single direction. The method wherein the releasing comprises powering off a magnet. The method wherein the moving comprises powering a magnet to carry the plurality of tie plates from the first position to the second position. The method wherein the driving occurs by at least one drive tire engaging a driven ring on the tie plate receiver.

According to an alternate embodiment, a tie plate sorter assembly comprises a first substantially cylindrical driving ring and a second cylindrical driving ring, at least one tie plate receiving surface extending between the first and second substantially cylindrical driving rings, the at least one tie plate receiving surface having at least one pass through aperture for allowing at least one tie plate to pass from an interior of the sorter to an exterior, a retaining mechanism engaging the at least one tie plate receiving surface for retaining the at least one tie plate until the tie plate is released. Optionally, the tie plate sorter assembly further comprises a pocket adjacent the at least one pass through aperture. The tie plate sorter assembly wherein the at least one retaining mechanism is magnetic. The tie plate sorter assembly wherein the at least one retaining mechanism is electromagnetic. The tie plate sorter assembly wherein the at least one retaining mechanism is actuated depending on the position of the tie plate sorter. The tie plate sorter assembly wherein the at least one retaining mechanism is actuated electrically. The tie plate sorter assembly wherein the at least one retaining mechanism is actuated mechanically.

According to a further embodiment, a tie plate sorter assembly, comprises a tie plate receiver having a first end and a second end, at least one location for receiving tie plates into said tie plate receiver, the tie plate receiver having at least one side wherein tie plates are deposited, the tie plate receiver having at least one aperture discharging tie plates. The tie plate sorter assembly further comprises a mechanical structure to engage or disengage a magnet. The magnet may retain the tie plates in the receiver until the magnet is disengaged. The tie plate sorter assembly further comprises an electromagnet. The tie plate sorter assembly further comprises a pocket wherein at least one of the plurality of tie plates is seated. The tie plate sorter assembly wherein a magnet is positioned adjacent the pocket. The tie plate sorter assembly wherein the aperture is formed in the pocket area.

According to still a further embodiment, a tie plate sorter assembly comprises a tie plate receiver having a first end and a second end, an input location for tie plates into the tie plate receiver, a plurality of circumferentially spaced pockets about the receiver, a retaining mechanism located at the pocket to retain at least one of the tie plates in the pocket, an aperture in the pocket to selectively release the at least one tie plate. The tie plate sorter assembly wherein the aperture discharges the at least one tie plate externally of the receiver. The tie plate sorter assembly further comprises a conveyor to receive the discharged at least one tie plate. The tie plate sorter assembly wherein the pockets extend in an axial direction.

According to some embodiments, a tie plate sorter comprises a generally circular receiver having a generally hollow interior, a drive assembly capable of rotating the receiver, the receiver having a surrounding wall and a plurality of apertures within the surrounding wall, at least one end wall extending radially inward from the surrounding wall, a path in communication with at least one of the plurality of apertures, the path having a retaining mechanism positioned therealong, the retaining mechanism selectively retaining and releasing tie plates from within the receiver to an outside of said receiver. The tie plate sorter wherein the retaining mechanism comprises a magnet. The tie plate sorter wherein the magnet is an electromagnet. The tie plate sorter wherein the magnet is a permanent magnet. The tie plate sorter wherein the circular body includes a plurality of switches on the at least one end wall. The tie plate sorter wherein the switches are electrically connected to a solenoid. The tie plate sorter wherein the solenoid is electrically connected to the retaining mechanism. The tie plate sorter wherein the retaining mechanism is an electromagnet. The tie plate sorter wherein the path includes a member spaced from each of the apertures in the surrounding wall. The tie plate sorter wherein the retaining mechanism is positioned on the member. The tie plate sorter wherein the path extends generally tangentially from the surrounding wall.

According to some embodiments, a tie plate sorter comprises a rotatable body formed of at least one outer surrounding wall having a plurality of apertures defining an outlet path, a radial wall having an inlet aperture, the radial wall extending toward the surrounding wall, a path member spaced from each of the plurality of apertures, a retaining mechanism disposed along the outlet path to either retain or release tie plates, a switch associated with the retaining member to actuate the retaining mechanism. The tie plate sorter wherein the retaining mechanism is disposed on the path member. The tie plate sorter further comprising a solenoid to power the retaining mechanism. The tie plate sorter further comprising a switch arm which either engages or disengages a switch lever. The tie plate sorter wherein the retaining mechanism is normally powered until a switch arm engages a switch lever.

According to still other embodiments, a tie plate sorter comprises a receiver having an input aperture and a plurality of output apertures, a drive assembly to rotate the receiver, wherein tie plates move from the input aperture to the plurality of output apertures, a path including the plurality of output apertures, a path member including a retaining mechanism disposed along the path, the retaining mechanism being operable to either retain or release the tie plates at a selected position of rotation of the receiver. The tie plate sorter wherein the receiver is generally circular in shape. The tie plate sorter wherein the path extends generally radially outward from the receiver. The tie plate sorter wherein the path extends in a first radial direction and a second substantially tangential direction. The tie plate sorter further comprising a stabilizer assembly. The tie plate sorter further comprising a thrust limiting roller. The tie plate sorter wherein the thrust limiting roller is adjustable in an axial direction of the receiver. The tie plate sorter further comprising a vertical lift limiting roller. The tie plate sorter wherein the vertical lift limiting roller being adjustable in a vertical direction.

According to some embodiments, a system for controlling a tie plate feed assembly, comprises a fluid reservoir, a pump in fluid communication with the reservoir, a regulator valve, a receiver motor and a mover motor, the valve being adjustable to a preselected pressure, wherein above the preselected pressure the mover motor is inhibited from operating, wherein below the preselected pressure, the mover motor drives a tie plate mover to move tie plates into a receiver for sorting. The system wherein the fluid reservoir is a hydraulic fluid reservoir. The system wherein the mover is a conveyor. The system further comprising a hopper. The system wherein the valve is an adjustable regulator valve. The system wherein the valve controls feeding of tie plates to a receiver. The system wherein pressure increases above the preselected pressure when the receiver is overloaded with the tie plates. The system wherein pressure decreases below the preselected pressure when the receiver has too few tie plates.

According to some embodiments, a system for controlling a tie plate feed assembly comprises a tie plate mover in feed communication with a tie plate receiver which sorts tie plates, a receiver motor for operating the tie plate receiver, the receiver motor driven by a drive assembly, a mover motor in communication with the drive assembly, wherein the mover motor is inoperable if a drive parameter of the receiver motor is beyond a preselected value. The system wherein the parameter is a pressure. The system wherein the parameter is current. The system further comprising a hopper in communication with a mover, the mover operably connected to the mover motor. The system wherein the mover is a conveyor. The system wherein the mover is a vibrating feeder.

According to a further embodiment, a tie plate sorter control system, comprises a first motor drivably engaged to a receiver, a second motor drivably engaged to a tie plate mover of a feed system, a pressure regulating valve wherein pressure increases with loading of tie plates into the receiver, the pressure regulating valve in fluid communication with the first motor and the second motor, wherein the pressure regulating valve inhibits flow to the second motor when the pressure increases beyond a preselected value. The system further comprising a fluid reservoir. The system wherein the fluid is hydraulic fluid. The system wherein the receiver is continuously driven by the first motor. The system wherein the first motor is hydraulic. The system wherein the second motor is hydraulic. The system wherein the second motor is electric.

According to still further embodiments a conveyor assembly comprises a frame, including a first side and a second parallel side extending in a longitudinal direction, a head end having a first sprocket and a tail end having a second sprocket, a chain extending between the first sprocket and the second sprocket, a plurality of cleats connected to the chain and spaced apart along the chain, the cleat moving with rotation of the sprockets and movement of the chain. The conveyor assembly further comprising two sprockets at a head end and two sprockets at a tail end of the conveyor. The conveyor assembly further comprising a first chain and a second chain. The conveyor assembly further comprises a metal plate disposed between the first chain and the second chain. The conveyor assembly further comprising a flap frame structure extending across the conveyor. The conveyor assembly further comprising a flap depending from the frame to the conveyor. The conveyor assembly further comprising a second smaller flap frame in the downstream direction of the conveyor from the flap frame structure. The conveyor assembly wherein the flap extends over the second smaller flap frame. The conveyor assembly wherein the second smaller flap frame limits movement of the flap in the direction of the conveyor movement.

According to some embodiments, a conveyor assembly for a tie plate distribution system, comprises at least one conveyor frame, a head end and a tail end of the frame, a conveyor belt extending between the head end and the tail end, a plurality of cleats integrally connected on the conveyor belt. The conveyor assembly further comprises a first flap frame extending across the conveyor. The conveyor assembly further comprises a flap depending from the first flap frame. The conveyor assembly further comprises a second frame flap, the flap extending to the second frame flap. The conveyor assembly wherein the second frame flap limits the flap from moving in a direction of the conveyor movement. The conveyor assembly wherein the flap engages tie plates and aligns the tie plates in a direction transverse to the conveyor movement.

According to some other embodiments, a conveyor assembly comprises a frame structure having a first head end and a second tail end, a first pair of sprockets at the head end and a second pair of sprockets at the tail end, a first chain extending between the sprockets at the head and tail ends, and a second chain spaced from the first chain and extending between the sprockets at the head end and the tail end, a plurality of cleats extending between the first chain and the second chain, the cleats spaced apart in a direction of movement of the first and second chains, providing spaces for positioning of tie plates. The conveyor assembly further comprising a flap frame extending across the conveyor assembly. The conveyor assembly further comprising a second flap frame extending across the conveyor assembly. The conveyor assembly wherein the flap depends from the first flap frame to the second flap frame. The conveyor assembly wherein the flap engages tie plates on the conveyor and aligns the tie plates.

BRIEF DESCRIPTION OF THE DRAWINGS

In order that the embodiments may be better understood, embodiments of the tie plate sorter in accordance with the present invention will now be described by way of examples. These embodiments are not to limit the scope of the present invention as other embodiments of the tie plate sorter of the present invention will become apparent to one having ordinary skill in the art upon reading the instant description. Examples of the present invention are shown in figures wherein:

FIG. 15 depicts a perspective view of an embodiment wherein guides are located within the receiver.

FIG. 16 depicts an end view of a receiver wherein a catch is disposed in the receiver.

DETAILED DESCRIPTION

Figure 1:
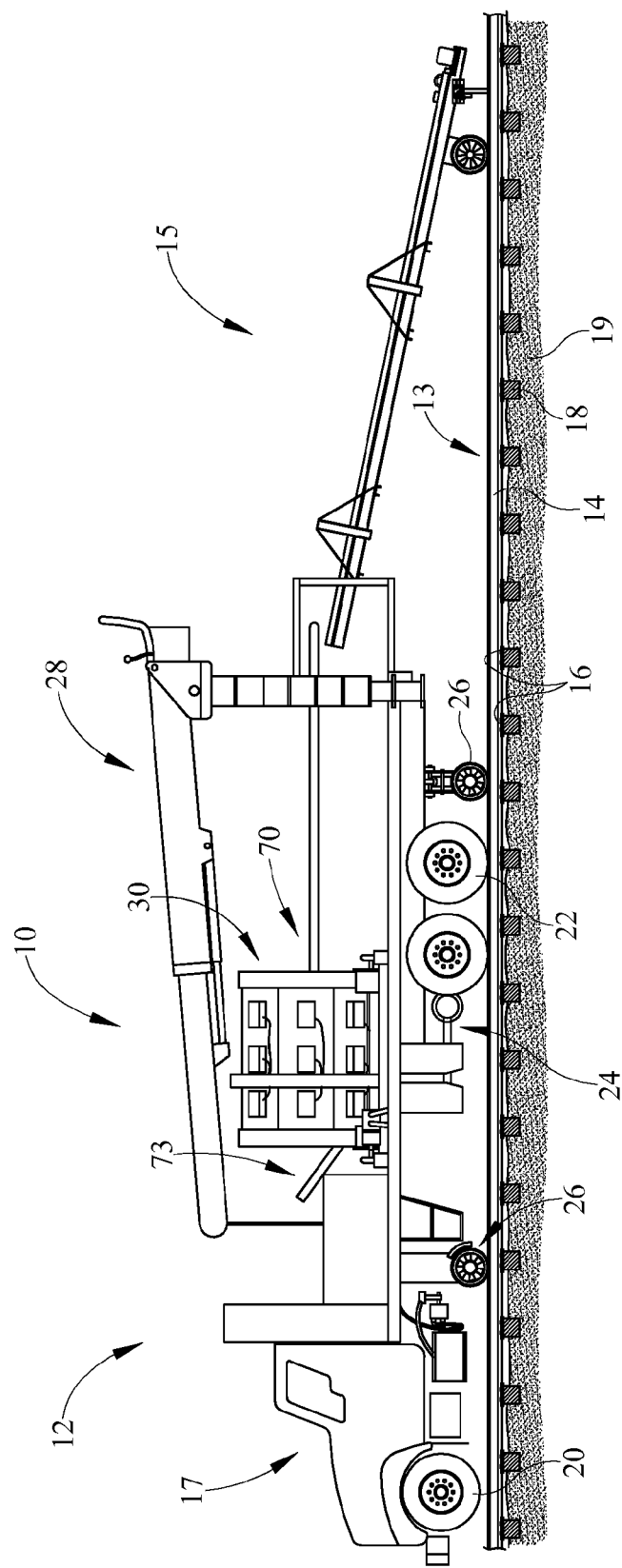
FIG. 1 depicts a side view of a first embodiment of a tie plate separator or sorter assembly and distribution conveyor.

It is to be understood that the tie plate sorter assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numeral indicate like elements throughout several views, there are shown in FIGS. 1 through 27 various aspects of a tie plate separator or sorter assembly which receives a plurality of tie plates and positions the tie plates sequentially on an exit conveyor for subsequent feeding to a tie plate distribution system. A method is further shown herein for performing the function described with the various structures disclosed.

Referring initially to FIG. 1, a side view of a tie plate sorter assembly 10 positioned on a hi-rail truck 12 for separating a plurality of tie plates positioned on the truck by a crane or other loading structure 28 and feeding a tie plate distribution system 15.

The tie plate separator or sorter assembly 10 is mounted on a truck or other vehicle 12 having capability of operating on a road or on a railroad track 13, as shown. The railroad track 13 includes a pair of rails 14 disposed on tie plates 16. The tie plates 16 are positioned on the railroad ties 18 which extend generally perpendicular below the rails 14. The tie plates 16 connect the rails 14 to the railroad ties 18. The railroad ties 18 are positioned in ballast 19 which may be formed of various substrates which typically include some amount of gravel or rock.

Figure 10:
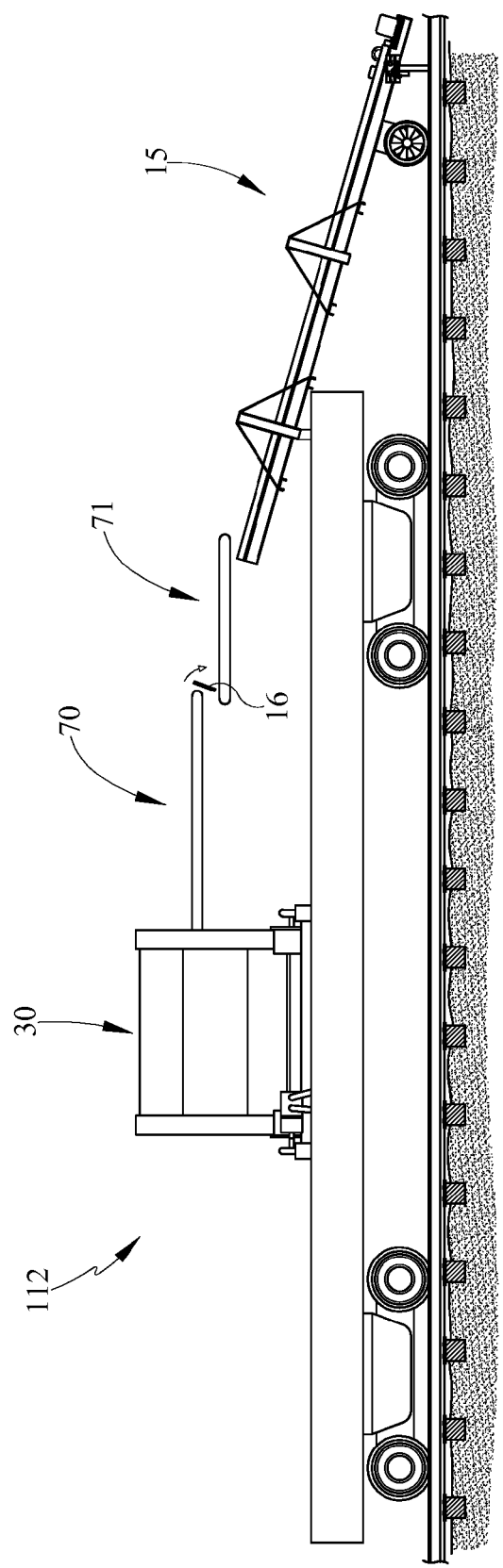
FIG. 10 and alternate vehicle for moving an exemplary tie plate sorter.

The truck 12 includes the front road tires 20 and at least one set of rear road tires 22. An engine and transmission connected to the rear road tires 22 provide propulsion for both on road and railway travel, according to the instant embodiment. The vehicle 12 also includes rail wheels 26 which allow movement along rails 14 by way of propulsion from at least one of the front and rear tires 20 and 22. The truck 12 includes an auxiliary drive system 24 which also allows the vehicle to operate on the railroad tracks through the use of additional railwheels 26 shown. A crane 28 is located at the rear of the bed of the truck 12 for loading materials onto the truck 12 as well as clearing debris from railway worksites as needed. As shown in FIG. 10, an alternative vehicle 112 is depicted. The vehicle 112 is a flatbed cargo vehicle for train track 13 usage. The vehicle 112 is typically used for higher output tie plate production systems. In operation, vehicle 112 may follow behind vehicle 12, or other pulling vehicle, engine or tractor, so as to receive tie plates from crane 28. These vehicles should not be considered limiting as various types of vehicles may be utilized.

The tie plate separator assembly 10 includes a tie plate receiver 30 which operates in a cyclical manner to receive tie plates at one location and move the tie plates to a second location for depositing on a tie plate distribution system 15. The separator assembly 10 further includes a drive assembly 50 (FIG. 3) which causes cyclical motion of the receiver 30 to separate or sort the tie plates for positioning on an exit conveyor. The receiver 30, according to the instant embodiment, rotates about an axis which is parallel to the longitudinal axis of the truck 12, i.e. extending from the front tires 20 to the rear tires 22. The tie plate receiver 30 receives tie plates from input 73 and moves the tie plates from the receiver 30 by output 70. The input 73 may be formed of various roller, powered, vibrating, or gravity feed structures. The feed or input structure 73 may have a switch or other control structure for limiting the flow of tie plates 16 into the receiver 30.

Figure 2:
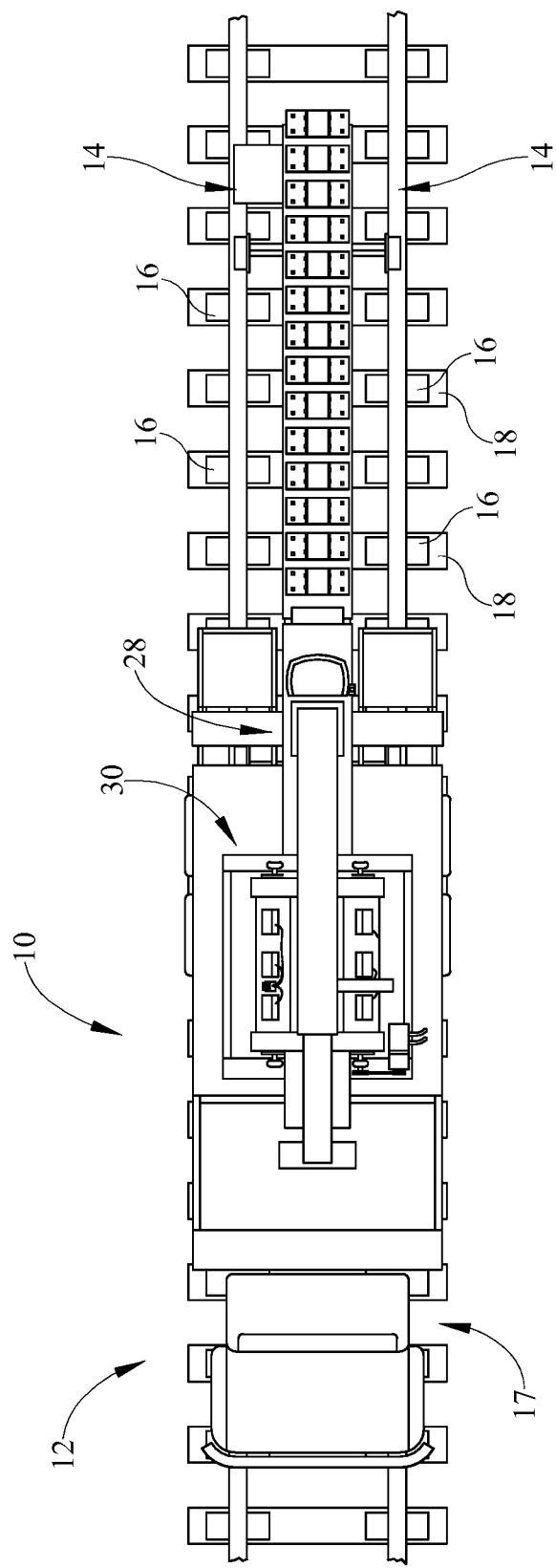
FIG. 2 depicts a top view of the embodiment of FIG. 1.

Referring now to FIG. 2, a top view of the truck 12 with the tie plate separator 10 is depicted. At a forward end of the truck 12 is the operating cab 17 wherein a driver can operate the truck 12 while in use during on road travel, and in order to position the truck 12 on the railroad track 13. Once the truck 12 is positioned on the track 13, the operator may move to a rear or cab area where the engine speed, auxiliary drive 24 and crane 28 may be controlled in order to propel the truck along the rails 14 and move tie plates 16 for processing in the receiver 30.

According to one embodiment of the tie plate separator assembly 10, the tie plates 16 are received by the receiver 30 at the vehicle forward end of the receiver 30 and are directed towards the rear of the vehicle 12 after the tie plates 16 are oriented in the tie plate receiver 30. The crane 28 feeds tie plates 16 to a plurality of feed devices such as a hopper, a vibrating feeder, a feed chute, a roller or belt conveyor or other structure which feeds the receiver 30.

Figure 3:
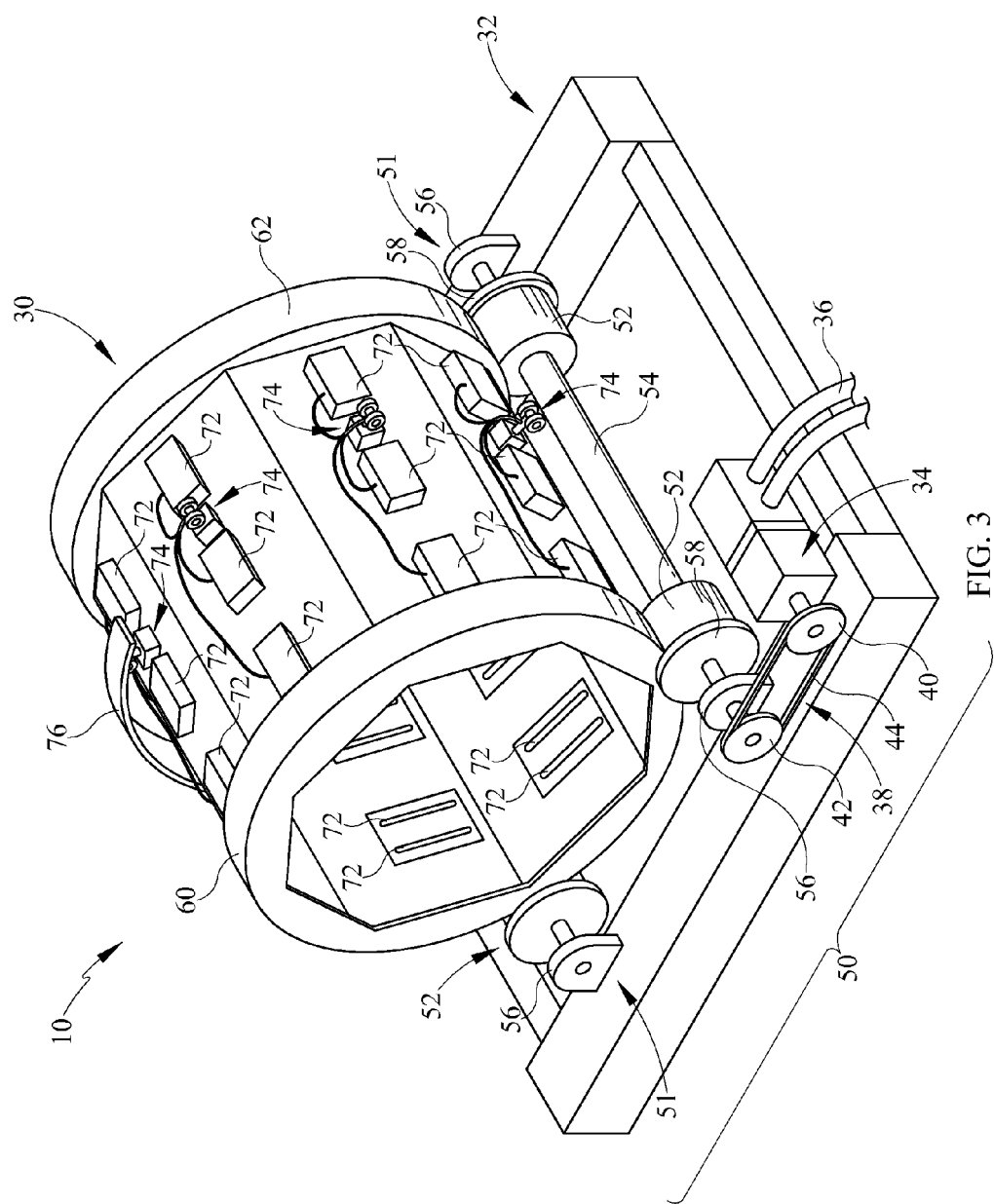
FIG. 3 depicts a perspective view of the tie plate sorter assembly removed from a tie plate distribution vehicle.

Referring now to FIG. 3, the tie plate separator 10 is shown including the receiver 30 and a drive assembly 50 positioned on a frame 32. Positioned on or adjacent to the frame 32 is a motor 34 which is powered by a power supply 36. The motor 34 may be electric or alternatively may be hydraulic. The power supply 36 therefore may be electric or may be a fluid supply utilized to rotate the hydraulic motor. Various power supplies may be used and exemplary descriptions should not be considered limiting.

In addition to the motor 34, the drive assembly 50 further comprises a transmission 38. The transmission 38 is shown including sheaves 40, 42 and a belt 44. The sheaves 40, 42 receive the belt 44 and together transfer torque from the motor 34 to at least one tire 52. Alternative drives may be utilized, however. For example, gear drives, chain drives or other transmissions may be utilized. The chain drive sprockets may replace sheaves 40, 42. Alternatively, a chain sprocket may extend about the receiver 30 and an adjacent sprocket may be positioned on a motor or transmission in order to turn the receiver 30 by way of a chain extending around both sprockets.

The drive assembly 50 further comprises tire assemblies 51, each having first and second tires 52 spaced apart along the axle 54. The tires 52 may be metallic, rubber, composite or other materials. The assemblies 51 are connected to the frame 32 by opposed bearings 56 between which the axle 54 extends. As shown in the exemplary embodiment, the device includes first and second tire assemblies 51 spaced apart to rotatably locate the receiver 30. In order to operate, the motor 34 is powered for rotation, causing rotation through the transmission 38 and tires 52. With rotation of the adjacent at least one drive ring, for example drive rings 60 and 62, opposite tire assembly 51 is also driven which allows for guided rotation of the receiver 30. While one tire assembly 51 is shown being driven by the motor 34, alternate embodiments may be provided wherein both tire assemblies may be driven.

Figure 4:
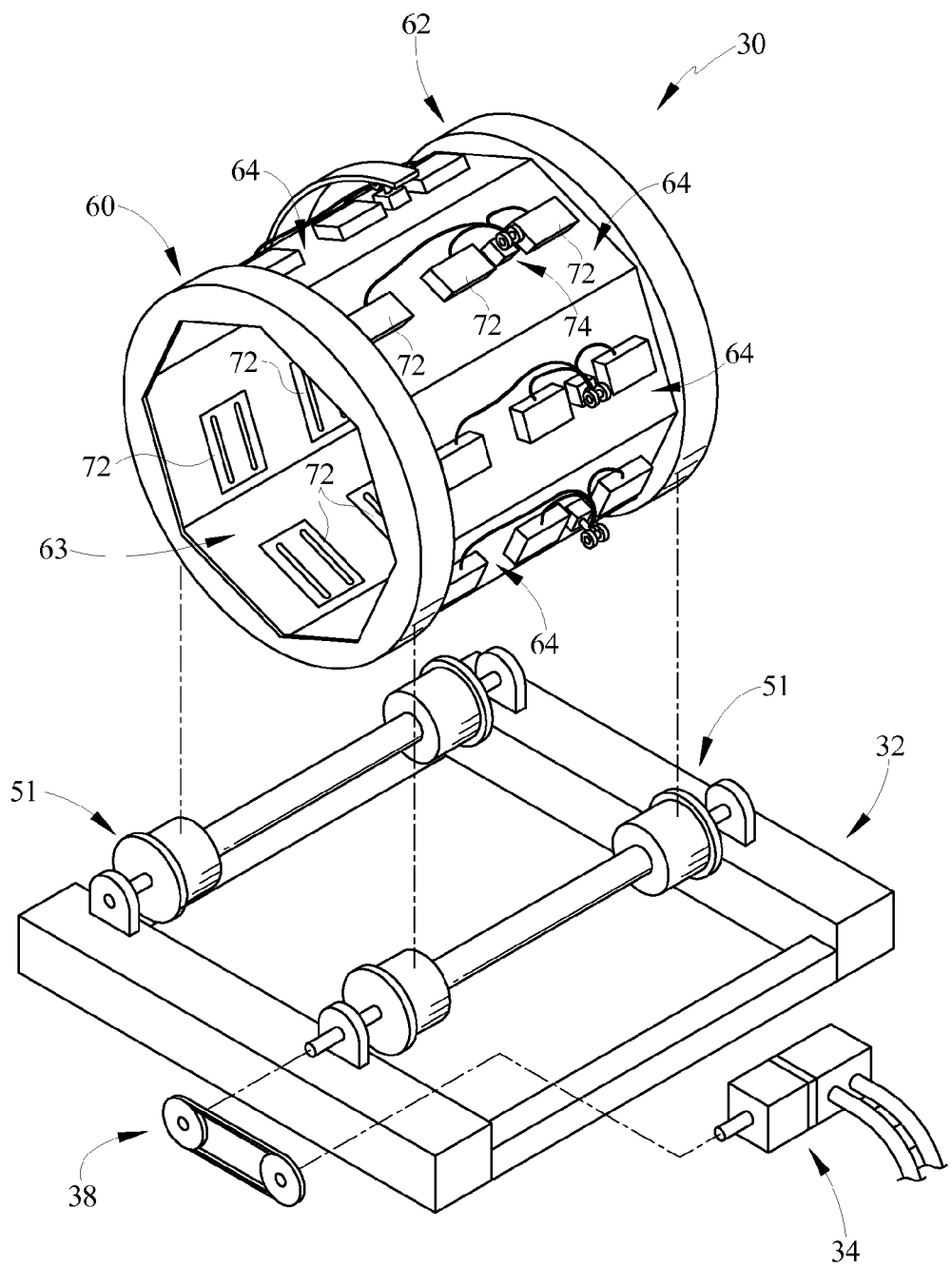
FIG. 4 refers to an exploded perspective view of the embodiments shown in FIG. 3.
Figure 5:
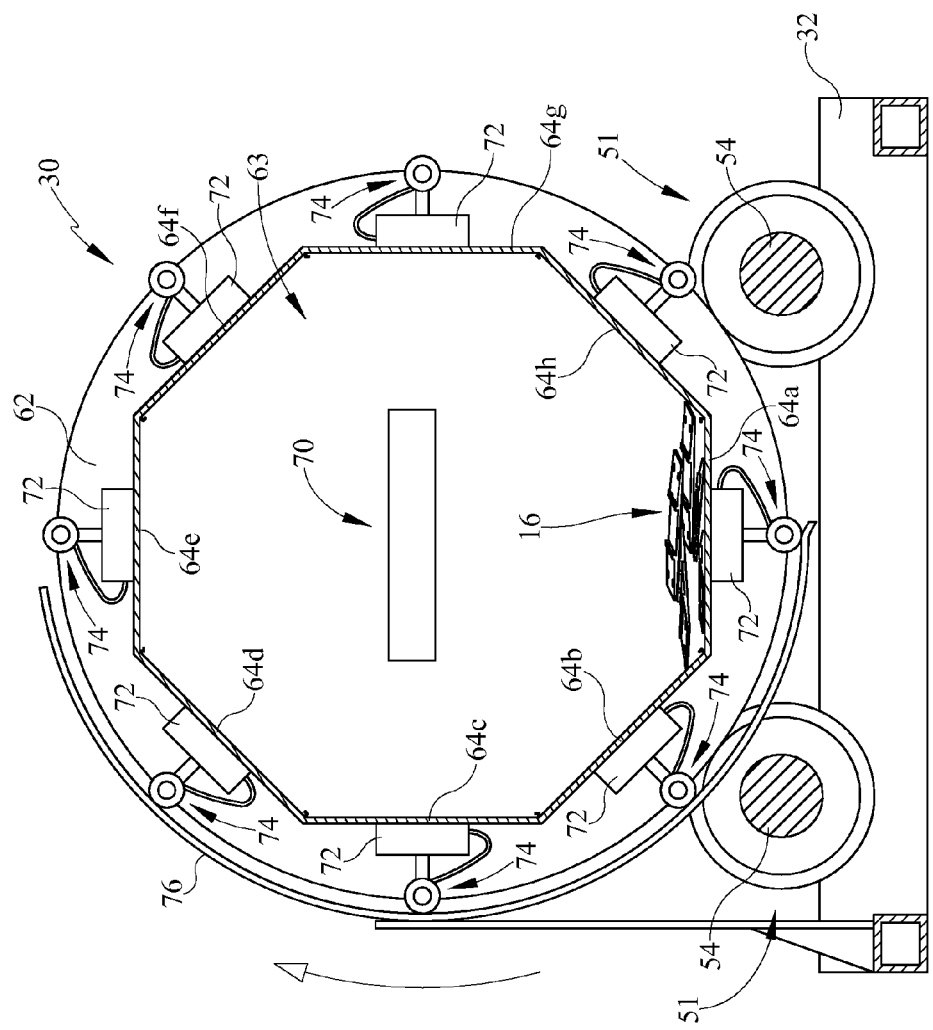
FIG. 5 depicts an end view of the tie plate receiver having a plurality of tie plates therein.

Referring now to FIG. 4, the receiver 30 is exploded from the frame 32 and the tire assemblies 51. Extending between a first drive ring 60 and a second drive ring 62 is at least one side 64. The at least one side 64 defines a geometric shape as best shown in FIG. 5 when viewed from an end of the receiver 30. The exemplary design utilizes an octagonal shaped hollowed area 63 of the receiver 30 which is formed by the eight sides 64. The hollow area 63 receives tie plates 16 from a feed device and feeds out separated tie plates via an exit or output conveyor 70. Alternatively, various shapes may be utilized which may be moved in cyclical fashion. For example, polygons, circles, curvilinear sides and other shapes may be used.

Referring still to FIG. 4, on or in each side 64 is at least one magnet 72. According to the exemplary embodiment, the magnets 72 are positioned on the outer surface of side 64 and apertures are cut in the sides 64 so that the magnetic force can retain tie plates 16 on the inside of the receiver 30. Other arrangements are contemplated however, dependent on the force attainable with the magnets. The exemplary magnets 72 are dual pole magnets however alternative magnets may also be utilized. Each of the magnets 72 retain at least one tie plate 16 against a side 64 during the rotation of the receiver 30 on the tire assemblies 51. The magnets 72 move with rotation of the receiver 30 so that magnetically retained tie plates are moved from the lower side of the receiver 30 to the upper side during the rotation. This causes loose tie plates to separate from the magnetically retained tie plates 16 which are held tightly by the electromagnetic force. As the receiver 30 rotates, the magnets 72 retain and move at least one tie plate 16 toward a discharge position. At such discharge position, the tie plates 16 are released on to a tie plate output 70, such as the exemplary conveyor. Other embodiments may be used. For example, although the magnets are shown inside receiver 30 with long side extending in a circumferential direction the receiver 30, the magnets 72 may be rotated so that the long side extends in an axial direction. Additionally, although magnets 72 are shown on each surface of the receiver 30, the magnets may be spaced to every other surface of the receiver or further depending on the desired throughput. Even further, the magnets 72 may be spaced in the axial direction of the receiver as well. Although three magnets 72 are shown in an axial direction, more magnets 72 may be used or fewer may be utilized.

Referring now to FIGS. 5 through 10, the receiver 30 is shown in a sectional end view moving through multiple positions due to cyclical motion of the tire assemblies 51. As previously described, the receiver 30 rotates in clockwise direction according to the exemplary views, so that the tie plates 16 deposited in the receiver 30 are moved toward the top of the receiver 30. When located at the top of the receiver, the tie plates 16 are transferred to a tie plate output 70. Since all of the lifting and positioning occurs in automated fashion, the structure and process provides for decrease in manual handling which results in decreased lifting injury. Also, the process results in increased efficiency, increased throughput of tie plates and ultimately decreased operating costs. In the FIGS. 5-10, the sides 64 are labeled 64a-64h for ease in distinguishing movement of the receiver 30.

In FIG. 5, the tie plates 16 are deposited on a tie plate receiver side 64a at a first position. This first position is a lowermost position for the specific side 64a described herein. The tie plates 16 may be delivered in a multitude of manners including a conveyor, a vibrating feeder, a chute or any of a variety of means in order to deposit tie plates 16 on the side 64a. Moreover, the tie plates 16 need not be deposited at the lowermost surface but may be positioned at a multitude of positions within the receiver 30. As shown in the Figure, the side 64a has a magnet 72 on an outer surface.

Adjacent the magnet 72 is a conductor 74 which engages a power supply 76 extending about the receiver 30. The power supply 76 is a copper or other conductive strip or band in the exemplary embodiment, however other structures may be utilized to provide power to the conductor 74. The power supply 76 may be charged by a battery, an alternator which may be connected to a hydraulic motor, a generator or other means. The magnet 72 is powered by the conductor 74, which is powered by the power supply 76. The power supply 76 is shown in the axial center of the receiver 30. However, as shown in other embodiments, the power supply 76 may be at axial ends of the receiver 30 or any position therebetween. The magnet 72 provides force sufficient to retain at least one tie plate 16, as previously described. According to the exemplary embodiment, each side 64a-64h includes a magnet 72. However, magnets 72 may be spaced on consecutive surfaces, alternating surfaces or as needed for desired output of tie plates 16. As shown in FIG. 3, the power supply 76 is depicted generally centrally positioned relative to the axial direction of the receiver 30. However, the structure 76 may be moved to axial ends of the receiver 30 or any position there between. Additionally, the power supply 76 may be located at ends as long as pathways are provided for feed and output structure 70.

Figure 6:
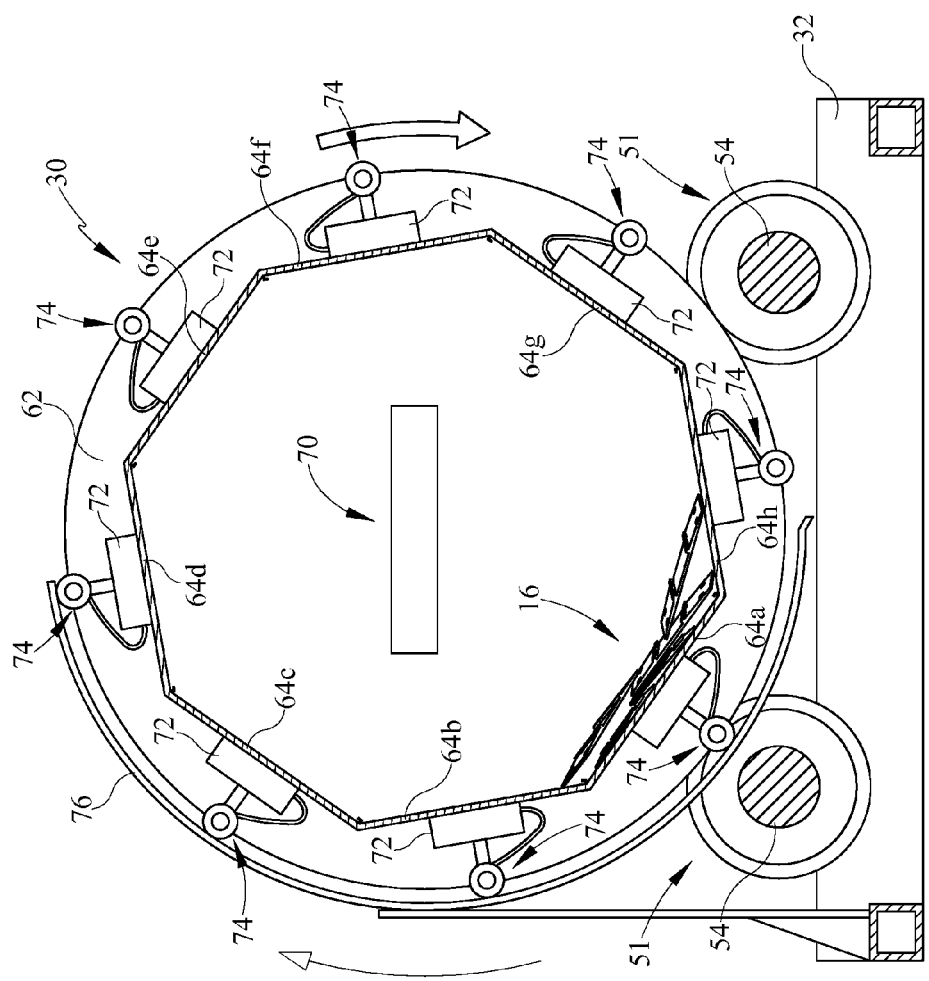
FIG. 6 depicts an end view of the tie plate receiver rotated through an arcuate distance from the position shown in FIG. 5.

With reference now to FIG. 6, as the tire assemblies 51 rotate a counterclockwise direction this causes clockwise rotation of receiver 30. The side 64a moves from a lowermost position (FIG. 5) to a position upwardly from that, as shown in FIG. 6. The tie plates 16 which are located against the surface 64a are held in position by the magnets 72. The conductor 74 continues to move with the rotation of the receiver 30. During the rotation, the conductor 74 stays in contact with the power supply 76 so that the magnet 72 continues to retain at least one tie plate 16 on surface 64a. As the rotation occurs, at least one tie plate 16 which is not immediately adjacent the magnet 72 will typically fall downward due to gravity to a lower surface 64h of the receiver 30. As tie plate 16 slides downward and engages at least one exposed magnet 72 on subsequent side 64h, the tie plate 16 will be retained as the receiver 30 continues rotation.

Figure 7:
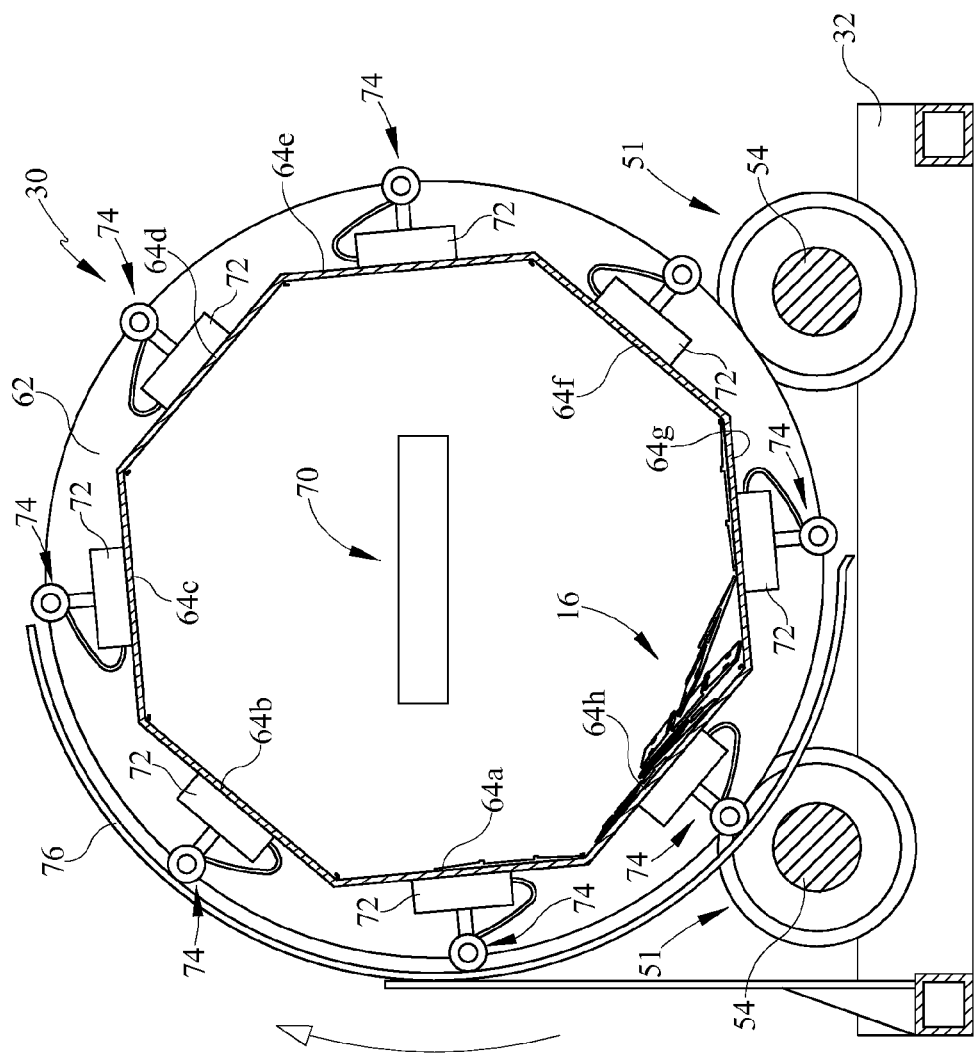
FIG. 7 depicts an end view with the tie plate receiver rotated further from the position depicted in FIG. 6.

Referring to FIG. 7, the tie plate 16 continues moving in the clockwise direction with rotation of the receiver 30. The conductor 74 maintains engagement with the power supply 76. The side 64a is vertically oriented due to the rotation of the receiver 30. On side 64a, a single tie plate 16 is held in position by the magnet 72, while all loose tie plates 16 have fallen downward toward the lower adjacent side 64h of the receiver 30. A majority of the tie plates 16 are disposed on side 64h. In the stack of tie plates 16 on surface 64h, the lowermost tie plate 16 adjacent the surface 64h will be held by the magnetic force while the remainder of plates may be loosely in position and will fall as rotation continues. At the lowermost side 64g, one tie plate 16 is disposed in the lowermost position of the receiver 30 having fallen from either or both of sides 64a and 64h. The tie plates 16 are held by electromagnetic force against the surface indicated while other tie plates slide toward the lower adjacent side 64g with continued rotation. The retaining force is available due to the engagement between the conductor 74 and the power supply 76. However, other selectively operable retaining mechanisms or forces may be used. For example, pockets which catch and hold the loose tie plates 16 may be utilized to release the tie plates 16 at an appropriate location. Additionally, pockets, guides, catches, lips or the other structures, including but not limited to those shown in FIGS. 11, 15 and 17 may also be utilized.

Figure 8:
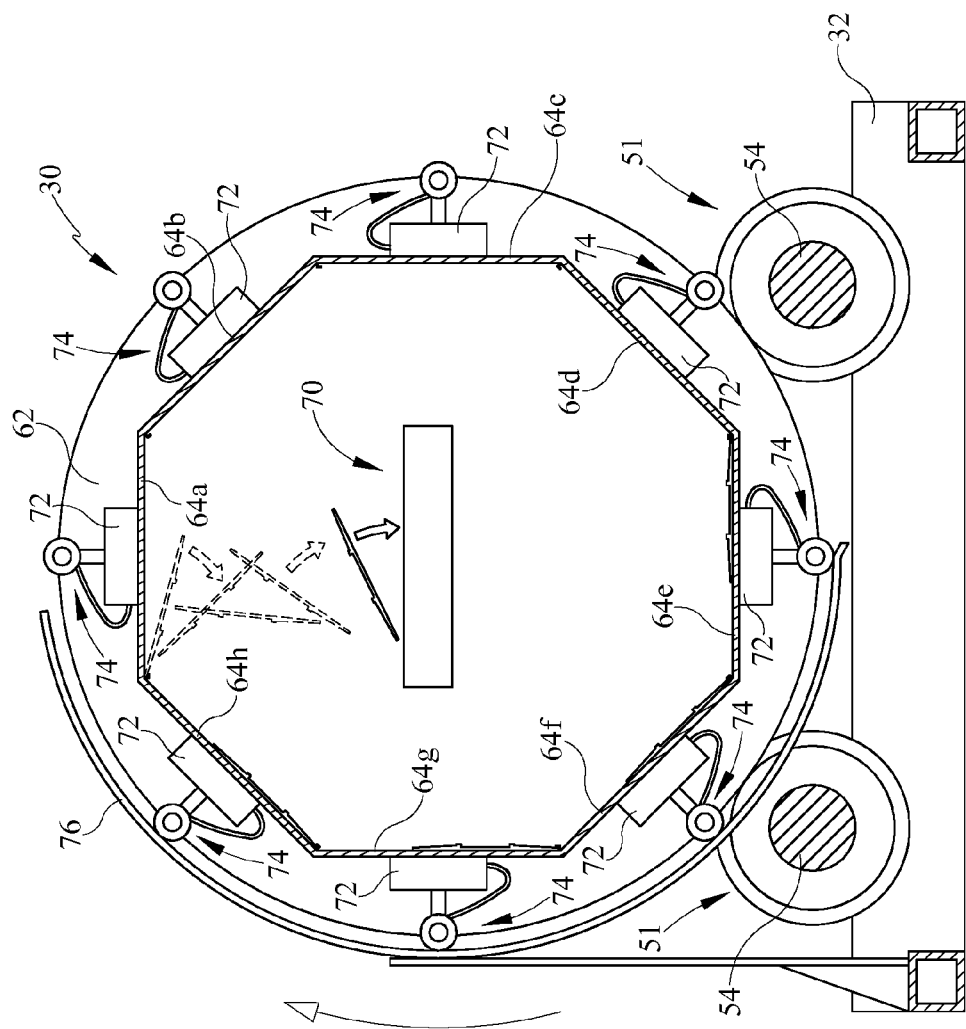
FIG. 8 depicts an end view of the tie plate sorter rotated even further from the position depicted in FIG. 7 and a tie plate falling onto an exit conveyor.

As shown in FIG. 8, the side 64a is disposed horizontally at the top of the cyclical rotation of the receiver 30. The conductor 74 of side 64a is disengaged from the power supply 76. With the magnets 72 of side 64a discharged, the tie plates 16 are released. Thus depending on the position of the receiver 30 or the magnets 72, the tie plates 16 are released. Since the side 64a is above the output conveyor 70, the tie plates 16 are released and begin to fall toward the output conveyor 70. One tie plate 16 is shown moving downward and rotating during the fall from the top uppermost surface 64 to an output conveyor 70. The tie plate output conveyor 70 moves the tie plates 16 out of the receiver and toward a tie plate distribution system 15 (FIG. 1) utilized with the vehicle 12. It may be also desirable to facilitate a complete discharge of the magnets 72 so as to release any dust or metallic debris which may delay or inhibit release of the tie plates 16. One such structure may be a rectifier but such device should not be considered limiting as various discharge devices may be utilized.

Figure 9:
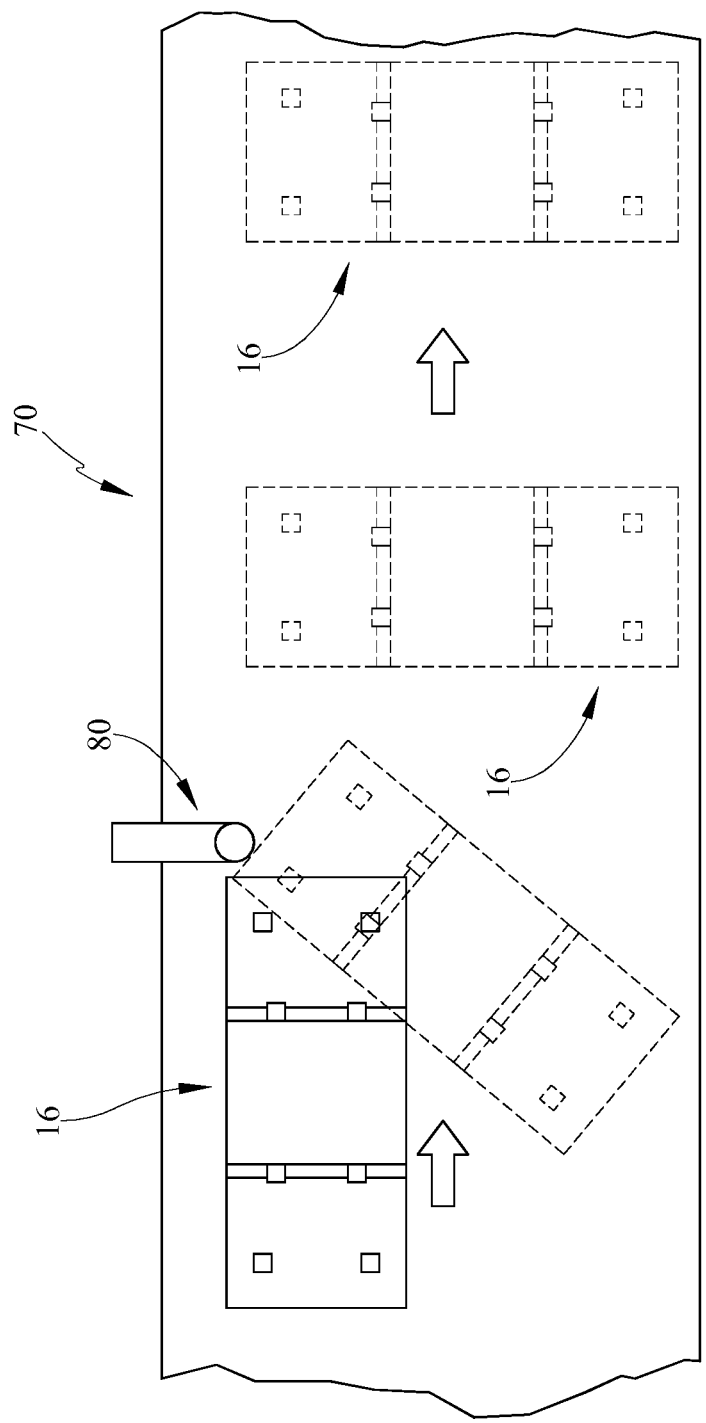
FIG. 9 depicts a top view of an exit conveyor wherein the tie plate orientation is changed if necessary.

Referring now to FIG. 9, a top view of the output conveyor for tie plate output 70 is shown. As depicted in the figure, a tie plate 16 is disposed at the left hand end of the segment of conveyor 70. The tie plate 16 engages an orientation structure 80. The exemplary embodiment utilizes a post 80 to cause rotation of the tie plate 16 about a vertical axis as the tie plate 16 moves with the output conveyor 70. The rotation of the tie plate 16 is shown in broken line as the tie plate 16 engages the orientation structure 80 causing the rotation about a vertical axis. With further movement of the conveyor 70, the orientation moves about 90 degrees from a longitudinal alignment with the conveyor to an orientation which is generally perpendicular to the longitudinal axis of the conveyor 70. Additionally, the orientation of the tie plates 16 may need to be rotated about a horizontal axis. In other words, it may be desirable to rotate the tie plate from the bottom surface as shown in FIG. 9 to the top surface. One method of doing this is to drop the tie plates from one conveyor to a second conveyor allowing the tie plate to flip or rotate about the horizontal axis. As shown in FIG. 10, output conveyor 70 drops to a secondary output conveyor 71. This causes rotation of the tie plate 16 from one surface to a second surface. The height differential of the space between conveyor 70 and 71 may be adjusted so as to allow for rotation to the appropriate side desired. Thus, with the tight spacing between the layers, a tie plate may not be allowed to rotate or with a wider spacing, the tie plate may be able to rotate 180 degrees so as to flip sides for feeding through the tie plate distribution system 15. This will be partially dependent on tie plate dimensions as will be understood by one skilled in the art.

Figure 14:
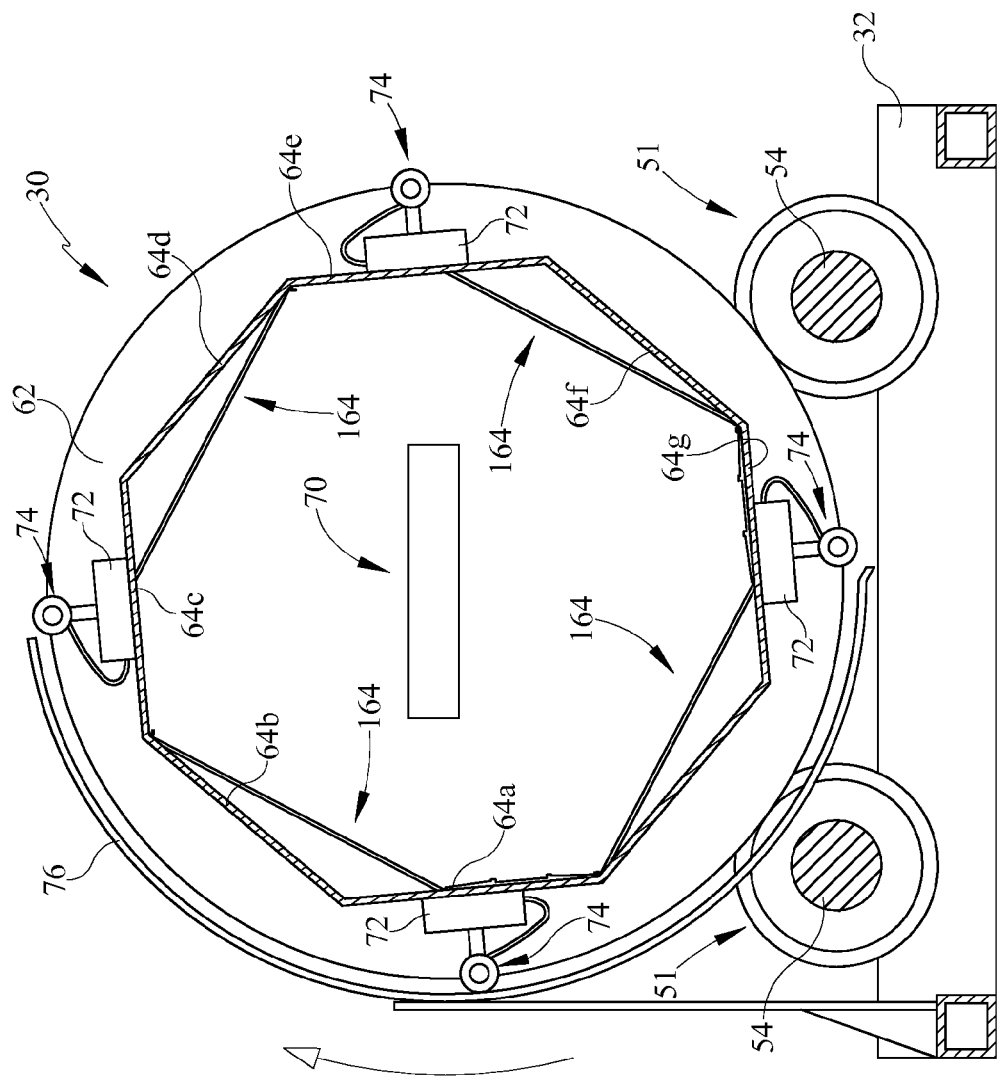
FIG. 14 depicts an end view of an alternative receiver with at least one slide surface.

Additional embodiments are shown, with reference to FIG. 14, depicting that the magnets 72 may also be spaced apart at further distances than every surface 64 of the receiver 30. For example, the magnets 72 maybe spaced at every other surface as shown, or at farther distances. According to a further embodiment shown, a sliding surface 164 may be positioned between, for example, surfaces 64a and 64g. The sliding surface more closely approximates a circular surface upon which the plates 16 may slide rather than fall to surface 64g where the at least one magnet 72 is positioned. This surface 164 allows for quieter movement of tie plates 16 and may be used between immediately adjacent surfaces or where magnets 72 are spaced apart at farther distances as shown. Other arrangements of slide surfaces may be utilized and should be considered within the scope of this disclosure.

As further depicted in FIG. 15, guides 134 may be utilized in the receiver 30. The guides 134 may be positioned to locate tie plates 16 into a desired orientation and position. Additionally, the guides 134 may further limit the capture of more than one tie plate by any magnet 72. The guides may be welded or fastened and may be oriented to provide a multitude of tie plate 16 orientations. Therefore the embodiment shown should not be considered limiting.

As shown in FIG. 16, an end view of the receiver 30 is depicted wherein the catches 136 are depicted. These catches 136 receive ends of the tie plates 16 and cause the tie plate 16 to flip when the tie plate 16 is released from the top of the receiver 30 revolution. The flip of the tie plate 16 may be desirable when a desired orientation is needed and the normal release of the tie plate 16 from the receiver magnet 72 does not result in such orientation. The catch 136 may be formed of various structures, such as for example angle iron, and may be attached in a variety of manners.

Figure 11:
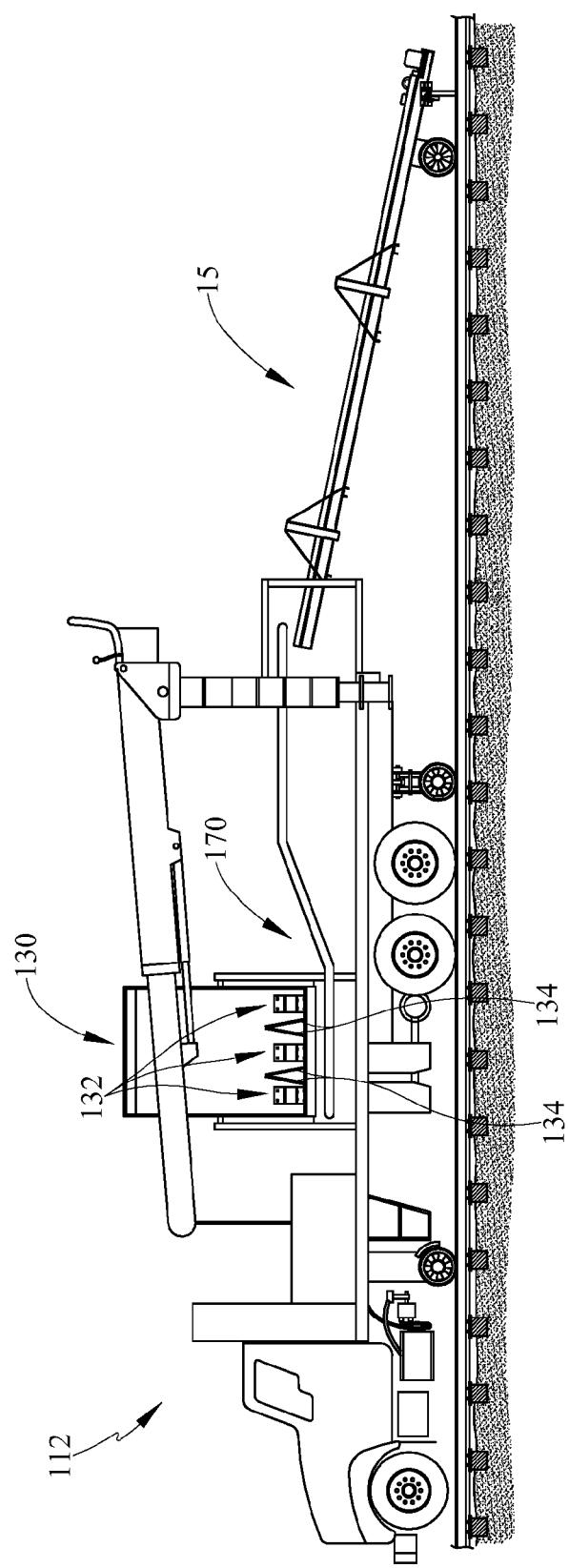
FIG. 11 depicts an alternate embodiment of a further cyclical operating tie plate receiver and sorter assembly.

Referring now to FIG. 11, a secondary embodiment of the invention is shown. In this embodiment the receiver 130 does not rotate in a circular motion, but instead has a cyclical motion which is in two directions. As shown, the tie plate receiving structure 130 includes a plurality of pockets 132 defined by guides 134. In these pockets 132, tie plates are disposed and a magnet may be utilized on the backside of the receiver structure 130 to retain the tie plate 16 in a position indicated. From this position the magnet may be released and the tie plate falls onto the conveyor 170.

Figure 13:
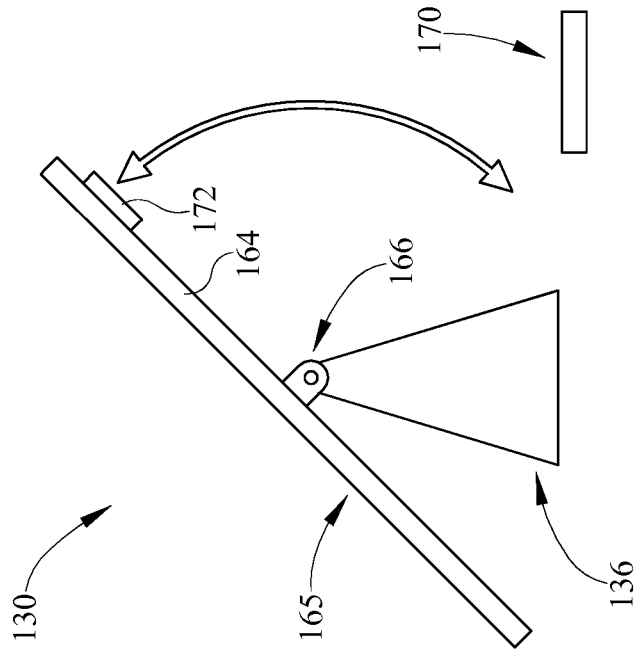
FIG. 13 depicts a side view of the alternate tie plate sorter of FIG. 11 in a second position.
Figure 12:
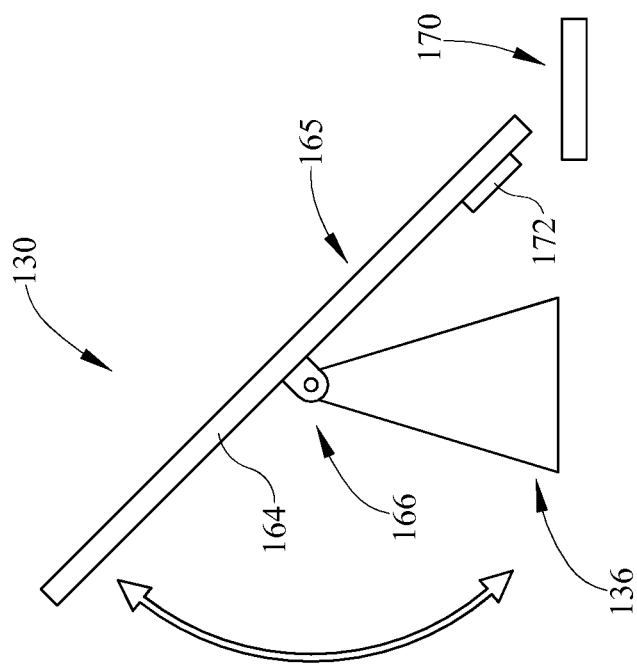
FIG. 12 depicts a side view of the alternate tie plate sorter of FIG. 11 in a first position.

Referring now to FIGS. 12 and 13, side views of the receiver 130 for sorting are depicted. The side view is rotated 90 degrees from that shown in FIG. 11. In FIG. 12, the receiver is shown having a first end which is elevated and a second end which deposits tie plates on the output conveyor 170. In FIG. 13, the second end is elevated so that the loose tie plates are moved to the opposite end of the receiver 130 and the properly oriented plates are held in position by magnets adjacent the pocket area 132 of the receiver 130. As shown in FIGS. 12 and 13, the motion is cyclical in that the ends of the receiver 130 move between first and second positions in a reciprocating fashion. This may be done through the use of a motor or an actuator, such as a pneumatic or fluid actuator.

In operation, the tie plates 16 are loaded on the cyclical receiver 130. The flat platter 164 of receiver 130 pivots has an upper side or surface 165 along which the tie plates 16 slide. The surface 165 of receiver 130 pivots at joint 166. The tie plates are moved away from the conveyor 170 by pivoting the end of receiver 130 opposite the conveyor 170 downward, as shown in FIG. 13. Next the receiver is rotated to the position in FIG. 12 causing the tie plates to slide toward the conveyor 170. The tie plates move into the pockets 132 formed by guides 134, thus orienting the tie plates 16. When the magnets are powered off, the tie plates in pockets 132 fall on the conveyor 170. Next the receiver 130 moves toward the position in FIG. 13, and the process starts again.

Figure 17:
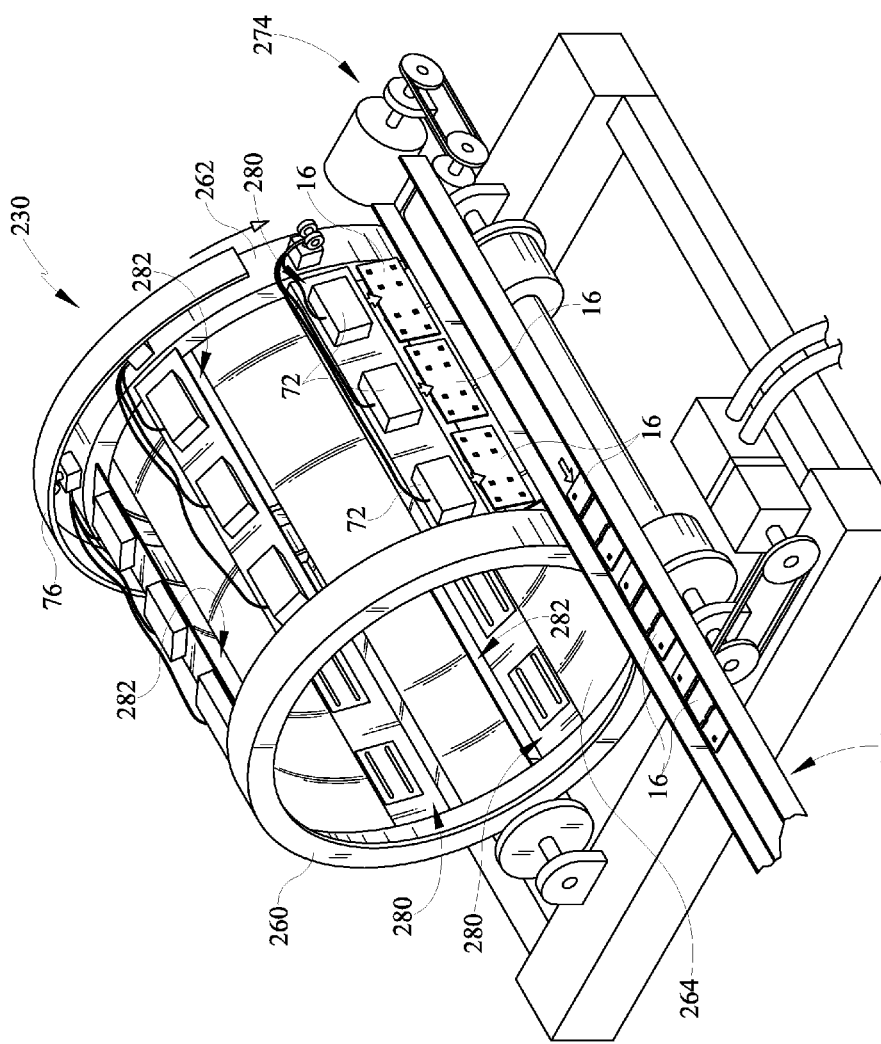
FIG. 17 depicts a perspective view of an alternative embodiment of a receiver.

Referring now to FIG. 17, a further alternative receiver 230 is shown and according to some embodiments has a first driving ring 260 and a second driving ring 262 spaced apart by at least one tie plate receiving surface 264. According to at least one exemplary embodiment, the at least one receiving surface 264 defines a circular shaped interior extending between the driving rings 260, 262. However, multiple shapes may utilize and such description should not be considered limiting. The tie plate receiving surface 264 includes a plurality of magnets 72 which retain tie plates against the tie plate receiving surfaces 264 at each magnet location. As previously described during operation, tie plates enter the receiver 230 at a first location and exit at a second location. However, at least some embodiments utilize at least one pocket 280. The pocket 280 comprises multiple magnets 72 thereon so that the tie plates 16 are retained in the pocket area of the receiver 230. The pocket 280 is defined by multiple walls however an opening or aperture 282 is defined along one area of the pocket 280 so that tie plates may be discharged.

Adjacent to receiver 230 is an external conveyor 270. The conveyor 270 receives tie plates 16 as they are discharged from the receiver 230. The conveyor 270 may take various forms including a roller conveyor, belt conveyor or other feeding or sliding mechanisms to move the tie plates 16. Adjacent the conveyor 270 is an exemplary motor and belt drive which defines a drive assembly 274. However the drive assembly may take various forms including gear drive or direct drive systems connected to a head or tail pulley.

In operation, the tie plates 16 are received through the opening defined by the first driving ring 260. The tie plates 16 rotate and slide within the receiver 230 and are retained and positioned by the retaining structure 72, such as for example a magnet. More specifically, the tie plates move into the pockets 280 and are held in position by the magnets 72 until the magnets are deactivated by ending communication with the power supply 76. When the power supply no longer powers the magnet 72, the aperture 282 is oriented generally downwardly so that the tie plate 16 are released through the receiver 230 toward the conveyor 270. From this position, the tie plate 16 moves away from the receiver 230 along the external conveyor 270.

Figure 18:
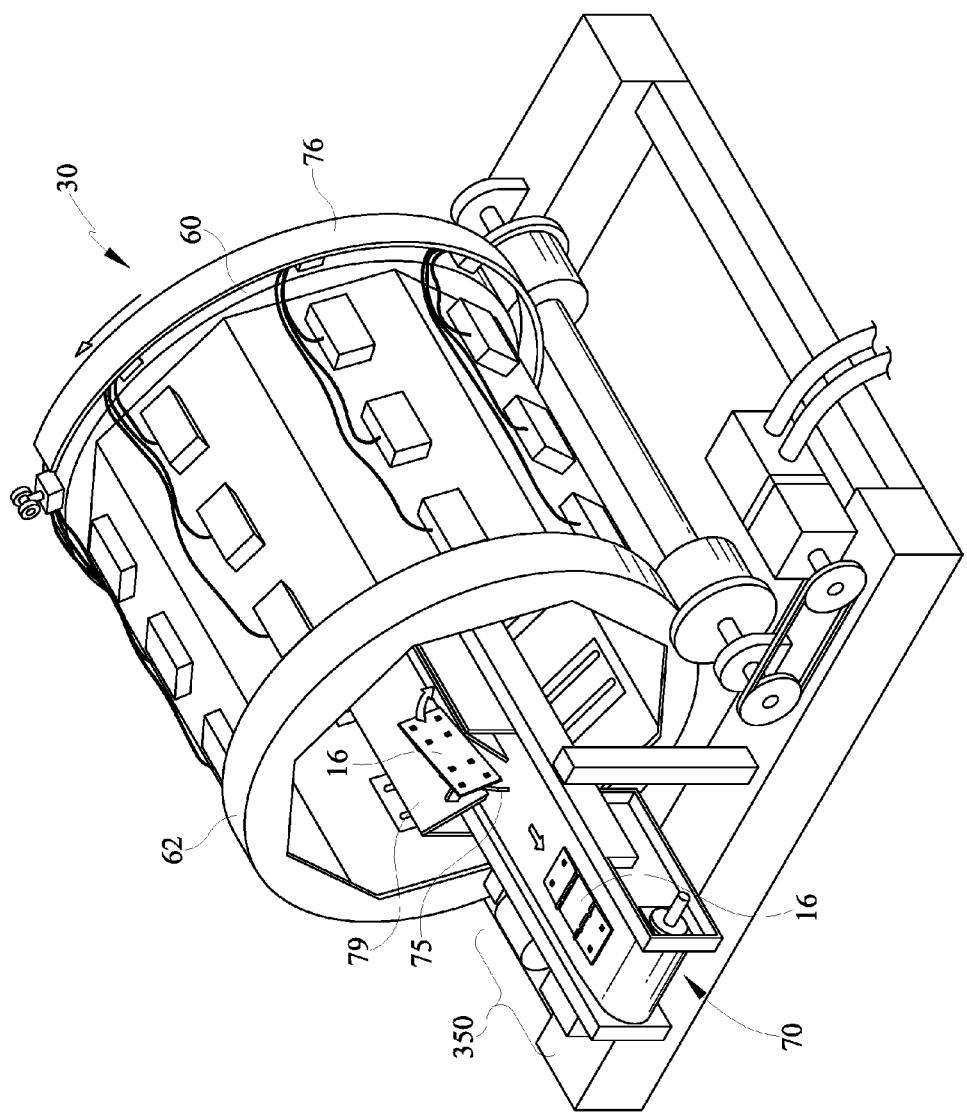
FIG. 18 depicts a perspective view of a further alternative output conveyor extending from a receiver.

Referring now to FIG. 18, a perspective view of the tie plate sorter assembly is shown. In exemplary discharge or output conveyor 70 is depicted internally of the receiver 30. According to one exemplary embodiment, the conveyor output 70 is generally positioned toward one side of the receiver 30. The conveyor 70 includes a motor and gear box defining a drive assembly 350. The conveyor 70 may be centered or may be moved toward one side of the receiver 30.

During rotation of the receiver 30, tie plates 16 are released as previously described from being retained from the retaining structures or mechanisms, for example, magnets. The magnets 72 may release tie plates 16 along sides or at the top of the rotation. When released at the side of the receiver 30, the tie plates 16 engage a slide surface 79 which directs the plates 16 onto the conveyor 70. Since the slide surface 79 temporarily positions tie plates on a lower edge of the tie plate 16 and leaning at an angle, the tie plate engages a flipping bar 75. The bar 75 causes the tie plate 16 to move to the desired orientation which is bottom down for further movement along the conveyor 70 and discharge to other tie plate distribution structures.

Figure 19:
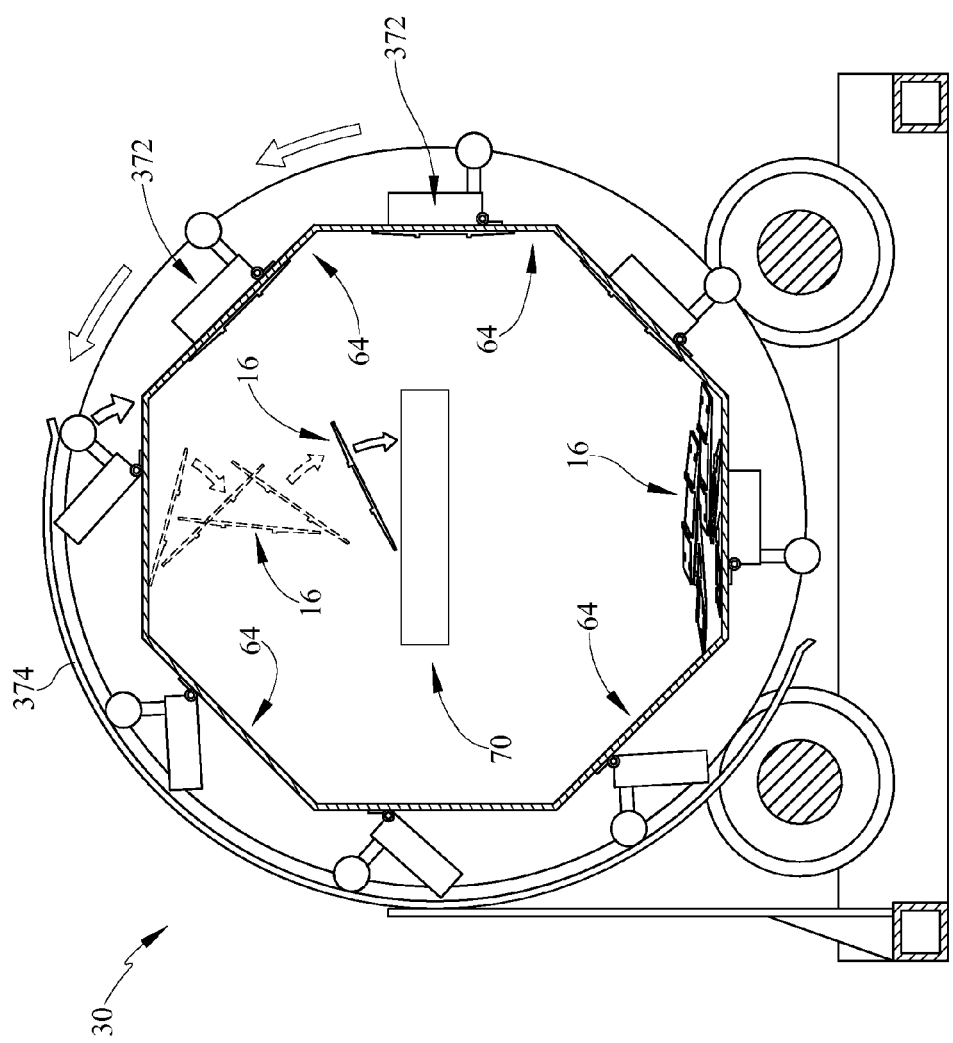
FIG. 19 is an end section view of an alternate retaining mechanism disposed on a receiver.

Referring now to FIG. 19, the receiver 30 shown in end view. In this view the receiver 30 rotates in a counterclockwise direction. The exemplary embodiments depicted in FIG. 19 show that the retaining structures 372 are permanent magnets and are engaged or mechanically disengaged from the receiver 30 depending on the position of the receiver during rotation. For example, magnets 372 are normally positioned against the surfaces 64 of the receiver 30. As the magnet 372 moves towards a disengagement bar 374, the magnets 372 include mechanical structure which engages the bar 374 causing the magnet to pivot or lift away from the surface 64 of the receiver 30. When the magnet moves away from the surface 64, the tie plate 16 may be released to the output conveyor 70. Once the receiver 30 continues rotation and magnets 370 clear the disengagement bar 374 near the bottom of the rotation cycle, the magnets 372 reengage the surfaces 64 and begin lifting tie plate 16 upwardly along the rotation cycle until reaching the disengagement bar 374. Although a pivot structure is shown, the magnet 372 may be moved in a variety of ways.

It should be understood that the various retaining structures such as electromagnetic, magnetic or other structures which are used to retain the tie plates 16 against the inside surfaces of the receiver 30 may be utilized in combination with various embodiments of an internal conveyor 70 or external conveyor 170. Additionally, the various forms of magnets may be utilized with any of the embodiments described herein.

Figure 20:
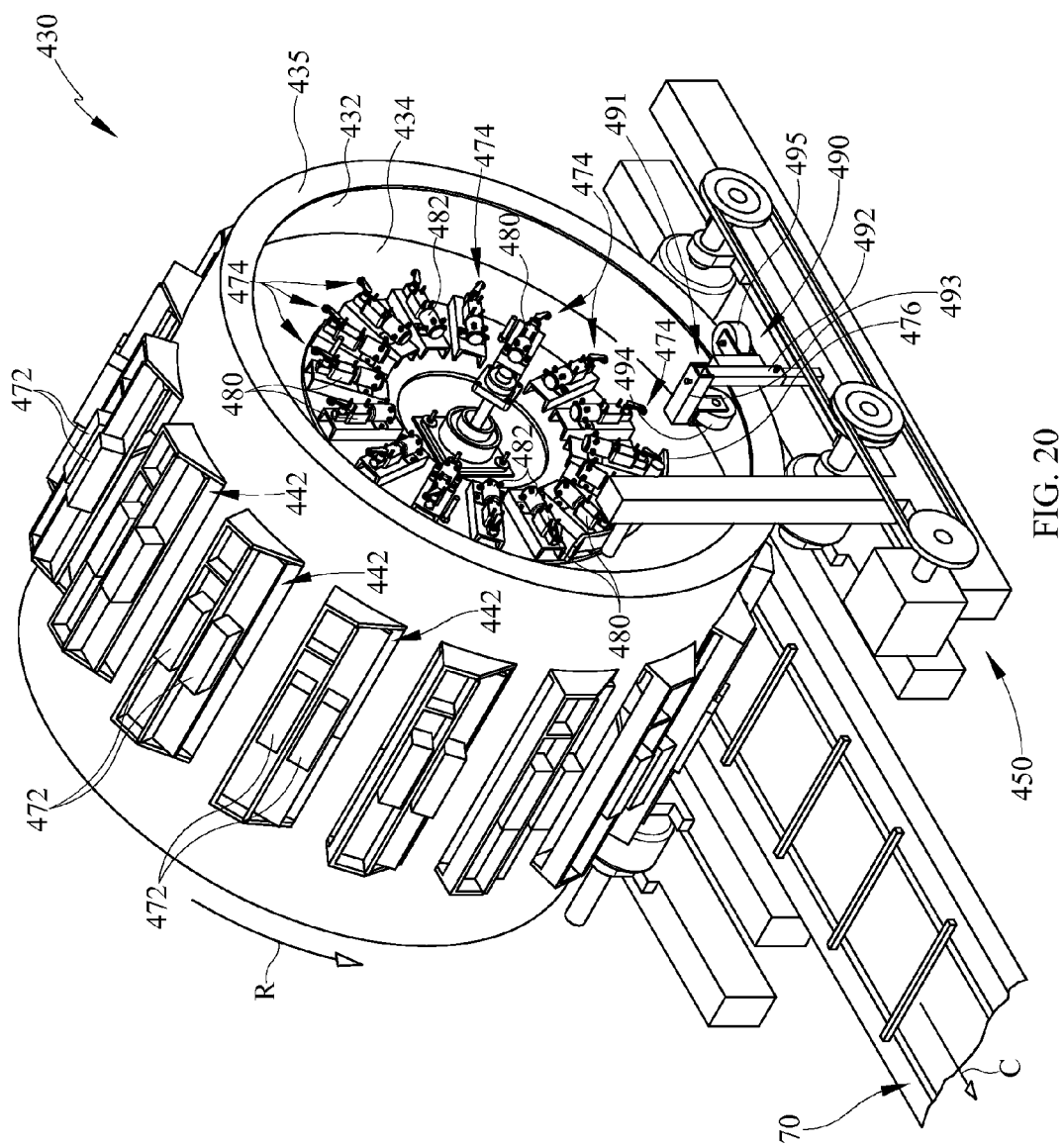
FIG. 20 is a perspective view an alternate embodiment of a tie plate sorter.

Referring now to FIG. 20, a perspective view of a receiver 430 is depicted as an alternate embodiment as previously described. The receiver 430 has a generally circular shaped drum or body formed of a circular side wall or surrounding wall 432 and at least one radial or end wall 434. Although the term end wall is used, the wall 434 need not be at the axial end most position of the wall 432. Near axial ends of the wall 432 are lips 435 which provide an aid for limiting thrust movement of the sorter drum or receiver 430, described further herein. As an optional alternative, and as shown in previous embodiments, the receiver 430 may be formed of multiple linear side segments forming a polygon with circular end rings to allow the polygonal structure to rotate. Any of these types of embodiments may be considered generally cylindrical having a generally circular cross-sectional shape. The side wall 432 defines an interior volume which is generally hollow wherein tie plates 16 are received for sorting. The cylindrical receiver 430 has a plurality of apertures 442 formed through the side 432 allowing passage from the inside of the receiver 430 to the outside. Beneath the receiver 430 is an exemplary output conveyor 70 upon which sorted tie plates 16 are deposited and moved away from the receiver 430 during operation. The conveyor 70 moves the tie plates from the receiver 430 in the direction C indicated longitudinally along the conveyor 70. A support structure includes a drive assembly 450 is positioned below the receiver 430 and causes rotation of the receiver 430 in the direction shown by arrow R. As with previous embodiments, the drive assembly 450 may include a belt or chain drive or other transmission types and may drive one or both axle assemblies shown for example. The receiver 430 and drive assembly 450 may be located on, as described in previous embodiments, a powered vehicle bed such as truck or train, flatbed or box types.

According to the instant embodiment, the end wall 434 includes a plurality of switch arms 474 which engage a switch arm lever 476. The lever 476 is formed of a flat bar stock in the exemplary embodiment and is curved along the circular path of the switch arms 474 so that the switch arms 474 engage or disengage the lever 474 based upon location of the switch arm 474 along the rotational path. The switch arm lever 476 is spaced a radial distance from center of rotation of the receiver 430 which corresponds to the location of switch arms 474. Additionally, the lever 476 has an arcuate length corresponding to a rotational location, or range of locations, wherein the tie plates are either released or retained. According to one embodiment, the switch arms 474 cause electrification of magnets when engaging the lever arm 476. In an alternate embodiment, the magnets are electrified continuously except when the lever arms 476 are engaged by the switch arms 474. In this second embodiment, which is depicted, when the switch arms 474 engage the lever 476, a retaining mechanism 472 is used to de-electrify or de-power the retaining mechanism 472, for example magnets, causing release of a tie plate 16 within the angular position of the lever 476. The switch arm lever 476 extends from a strut positioned on the drive assembly 450. However the switch lever 476 may be mounted in a variety of manners and the exemplary embodiment should not be considered limiting.

Referring still to FIG. 20, the switch arms 474 are each connected to a switch 480 and a solenoid 482. In general, the switch and solenoid define an actuator but various alternate types of actuators may be utilized. As the switch arms 474 rotate and engage the switch lever 476, a switch 480 is de-activated. In turn, this causes de-activation of a solenoid 482 which is normally powered to power on the retaining mechanism 472, for example electromagnets. Other structures may be utilized such as permanent magnets with mechanical means for separating the tie plates 16 and the like. Thus, when the switch arms 474 engage the switch lever 476, the electromagnets 472 are powered off so that the electromagnets release the tie plates 16. When the switch arms 474 disengage the lever 476, the electromagnets are powered on so the electromagnets 472 retain the tie plates 16. In other words, the tie plates 16 may be either retained or released by powering the electromagnets 472. This powering on and off occurs due to location of the switch arm 474 relative to discharge position along the circular path of the receiver 430. Otherwise stated, the switch lever 476 is positioned at a location where discharge is desired.

A stabilizing assembly 490 is also depicted in the instant Figure. The assembly 490 includes an adjustable frame 491 which allows adjustment in a vertical direction and an axial direction of the receiver 430. The frame 491 has an adjustable vertical member 492 and an adjustable horizontal member 493. Connected to the member 493 is a roller 494 which is disposed inside the lip 435 having a horizontal axis of rotation. The roller 494 inhibits vertical lifting of the receiver 430 during operation. Similarly, the vertical member 490 includes a roller 495 having a vertical axis of rotation which inhibits thrust movement in the axial direction of the receiver 430 during operation. The roller 495 engages the lip 435. A second assembly 490 may be positioned on the opposite side of the receiver 430 to at least inhibit thrust in the opposite direction.

Figure 21:
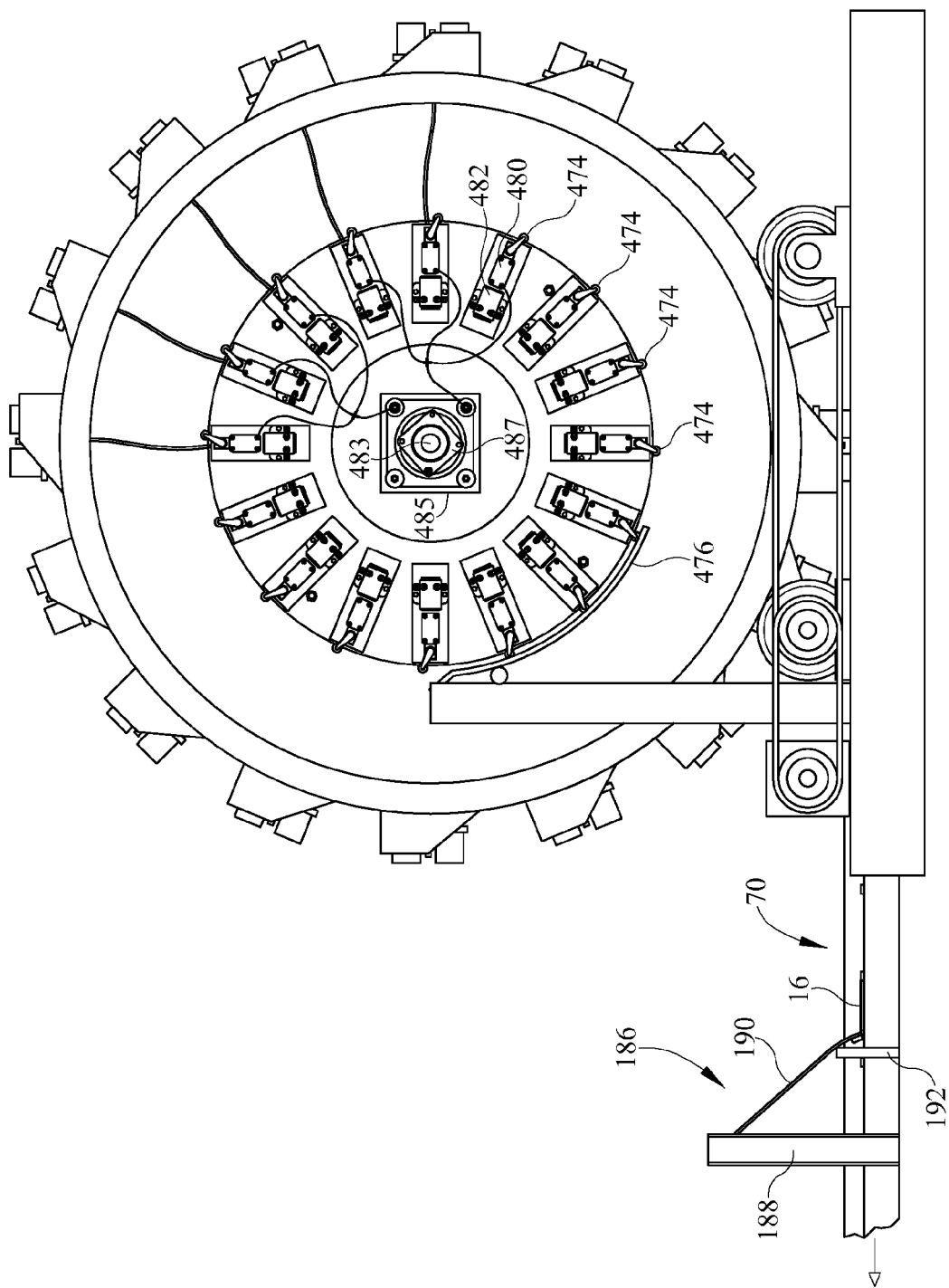
FIG. 21 is a side view of an embodiment of the tie plate sorter of FIG. 20.

With reference now to FIG. 21, the electrical system includes switch arms 474 which engage the switch arm lever 476 as previously described. The switch arms 474 are mechanically connected to the switches 480 and the solenoids 482, as previously described. The electrical system operates when the switch arm 474 engages the switch arm lever 476 causing a current of a pre-selected amount to move through the switch 480 and to the solenoids 482. The solenoids 482 provide a larger current which is capable of powering the magnets 472. Without such solenoids, the switches 480 could not provide the necessary current to drive the magnets 472, according to the instant embodiment. Although a mechanical switch arm is described, the actuation may be an electrical one.

The receiver 430 includes a first bearing plate 485 located centrally within the end wall 434. A bearing extends from the bearing plate 485 and an axle 483 passes through the bearing to an outboard second bearing plate 487, including bearing, spaced from the end wall 434. The inner bearing plate 485 may be used for one of a positive or negative connection for the electrical system and the second or outer bearing 487 may be used to provide an alternate positive or negative wiring connection for the electrical system. An insulator material (not shown) may be utilized between the inner bearing plate 485 and the end wall 434 in order to inhibit unintended charging of the receiver 430. The receiver 430 may also be grounded using various wiring connections as will be understood by one skilled in the art.

Referring still to FIG. 21 a tie plate alignment assembly 186 is depicted in the figure. The structure includes a vertical frame member 188 and a flap 190 depending downwardly therefrom. The flap 190 is weighted at a lower edge so that when the lower edge engages a tie plate 16, the tie plate is pushed into an alignment with a lower edge of the flap 190. Continued movement of the conveyor 70 eventually causes the tie plate to pass the flap 190 and frame 188. The frame 188 may include a horizontal member extending from the vertical portion that is extending into the page as depicted. Additionally, a smaller frame member 192 may also include a horizontal member extending into the page which engages the flap 190 and inhibits the flap 190 from pushing too far along in the direction of movement of the conveyor 70 and the tie plates 16.

The frame 188 extends across the output conveyor 70 and may include a first vertical member and a horizontal member. The exemplary embodiment also includes a second vertical member which defines the frame although such embodiment is not required.

Figure 23:
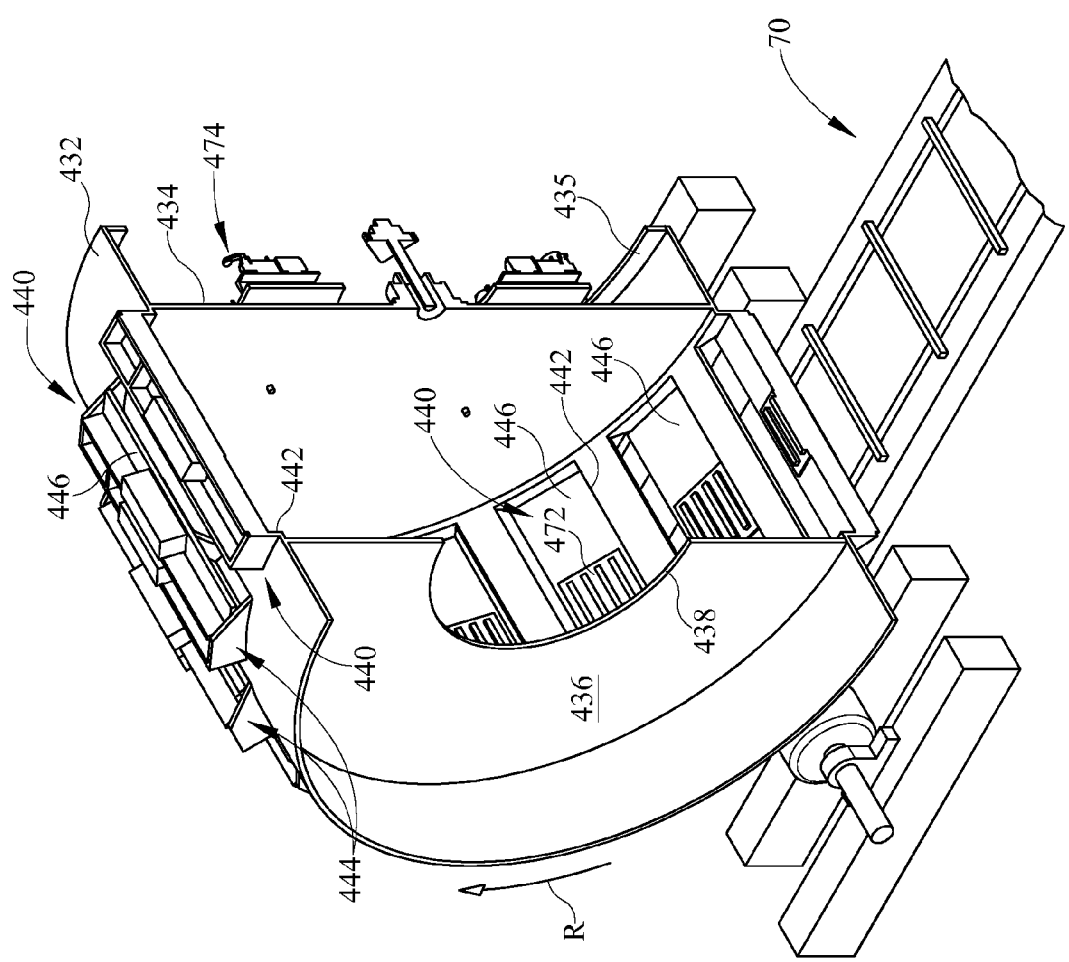
FIG. 23 is a side sectional view of an embodiment of the tie plate sorter of FIG. 20.

Depending from the horizontal member (not shown) of the frame is a flap. At a lower edge of the flap 190, a weighted member is fastened to the flap. The weighted member maybe formed of a steel structure or any such structure which will engage a tie plate 16 moving along the conveyor and cause the tie plate to engage a cleat 176 (FIG. 23). As an alternative, if the tie plate is not forced against the cleats, the flap and weighted member will at least straighten the tie plate relative to the direction of movement of the conveyor before the tie plate is forced to pass beneath the flap. A smaller frame structure is spaced forward of the flap according to the instant embodiment. The small frame inhibits the flap and weighted member from being pushed by the conveyor and tie plate so that the flap is no longer effective as to straighten the tie plates along the conveyor.

Figure 22:
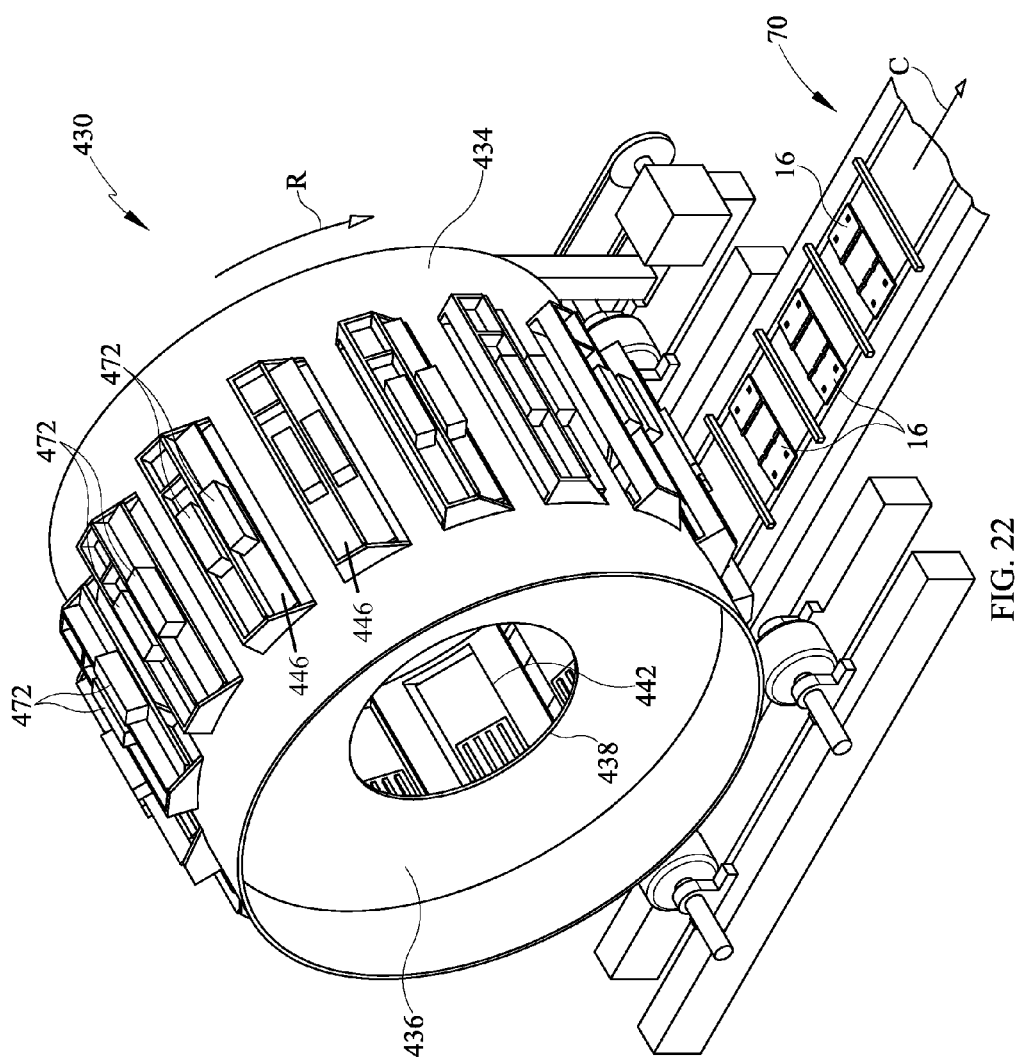
FIG. 22 is a perspective view of an embodiment of an opposite side of a tie plate sorter.

Referring now to FIG. 22, an alternate view is depicted wherein the receiver 430 input side is shown in perspective view. Opposite the side shown in FIG. 20, the input side has an input wall 436 with an aperture 438. A feed assembly 460 (FIG. 24) including conveyor, vibrating feeder, chute, other feed device, mover or a combination thereof, is positioned adjacent the aperture 438. This allows feeding or input of the tie plates 16 into the receiver 430.

During rotation of the receiver 430 in the direction R, tie plates 16 are deposited within the receiver 430 through aperture 438 as the receiver 430 rotates. The tie plates 16 move into pathways or pockets 440 (FIG. 23) through holes 442 formed in the inner surface of receiver wall 434. The retaining mechanisms, for example electromagnets, 472 are positioned along the pathway or within pockets 440 so the electromagnets 472 may release the tie plates 16 on the conveyor 70.

The path 440 of the tie plates 16 is best shown in reference to FIG. 23, where a section view of the receiver 430 is depicted. The path 440 according to the instant embodiment moves radially from inside to outside the receiver 430. The path 440 then turns in a tangential manner to pass from between member 446 and the wall 432. The receiver 430 includes a plurality of apertures 442 which are disposed in the side 432. These apertures 442 define portions of a path 440 through which the tie plates 16 are captured and move from inside the receiver 430 to outside the receiver 430. A frame 444 surrounds three sides of each aperture 442 and may be formed of one or more structures extending from or through said surrounding wall 432. The frame 444 extends a distance radially away from the outer surface of wall 432. At least one edge of the apertures 442 is unobstructed by the frame 444 so that the tie plates 16 may pass from inside the frame 444 to the conveyor 70 below.

Spaced from the aperture 442 in a radial direction and within the frame 444 is a member 446 to which the retaining mechanism 472 is attached. The frame allows the member to be spaced from aperture 442. The member 446 extends between walls of the frame 444 and does not obstruct the open side of the frame 444. In combination, the frame 444 including member 446 define a pocket recessed from the interior surface of the side 432. During operation, the tie plates 16 move radially through the apertures 442 into the path 440. The tie plates 16 are held in the position in the path 440 by the retaining mechanism 472 and against the member 446. This is occurring as the receiver 430 is rotating.

When the electromagnet is not powered, by the switch arm 474 engaging the switch arm lever 476 (FIG. 21), the tie plates 16 are released and move generally tangentially. The tie plates 16 encounter a member 446 wherein the retaining mechanism 472 is disposed. The frame 444 surrounds three of the sides of the member 446. When the tie plate 16 engages the member 446, the magnet 472 is powered on and retains the tie plate in position until the magnet is unpowered. At this time, the tie plates 16 fall from the member 446 and pass through the open side of the frame 444. The tie plates 16 are thereby deposited on the conveyor 70. As previously discussed, the present embodiment utilizes a continuously powered magnet which is unpowered when the tie plate 16 is moving close toward the conveyor 70. Upon release and continued rotational movement the magnet 472 is again powered to retain another tie plate and the process continues. However, these embodiments are exemplary and other embodiments are well within the scope of the present invention.

Figure 24:
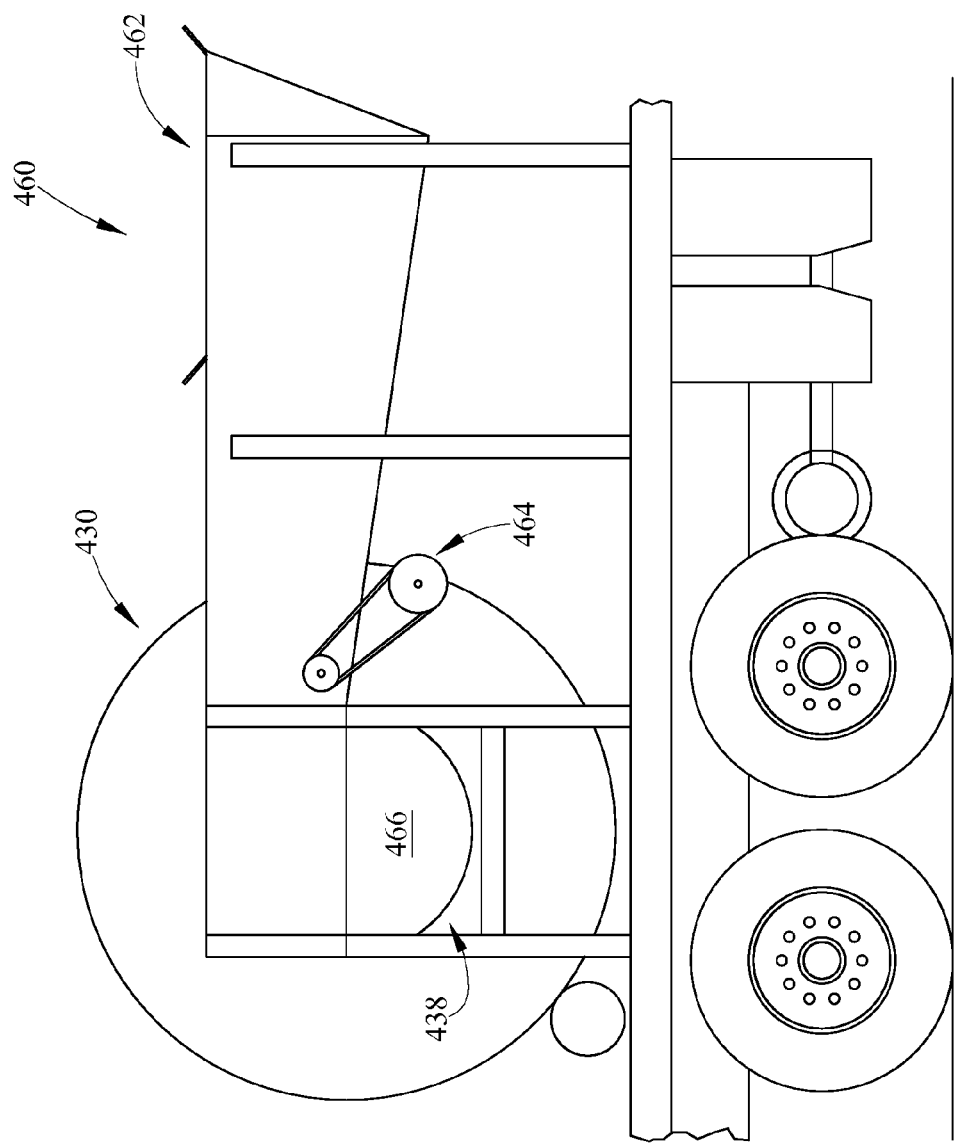
FIG. 24 is a side elevation view of a tie plate feeder assembly.

Referring now to FIG. 24, a feed assembly 460 is shown in side view. The feed assembly includes a hopper 462 which feeds to a conveyor, vibratory feeder or other mover for example not shown. The mover includes a motor 464 moves the tie plates 16 to a chute 466, in turn feeding the tie plates 16 into the aperture 438 of the receiver 430. The feed assembly may take various forms although it may be desirable that at least a portion of the structure be gravity feed in order to reduce power consumption of the assembly 460.

Additionally, the motor 464 may be electrical, hydraulic or other powered type in order to provide a method of controlling flow rate of tie plates 16 into the receiver 430. The assembly motor 464 is shown and is controlled through a control system 500 (FIG. 25) which is based upon the loading of tie plates 16 within the receiver and according to the instant embodiment, is hydraulic. If the loading within the receiver 430 is too high, the feed assembly 460 is stopped until the loading within the receiver is decreased. If the loading of the receiver 430 is too low, the motor 464 speed may be increased to increase loading of the receiver 430. Ultimately, it is desirable to control the output speed of the receiver 430 and one non-limiting method of doing such is to control the rate of tie plates 16 being fed into the receiver 430.

The feed assembly 460 receives a plurality of tie plates at a hopper 462. The tie plates 16 maybe loaded into the hopper by a crane, boom or other such structure having a bucket, claw, magnet or other lifting structure which may also mounted on the vehicle. Alternatively, an alternate vehicle having such structure to load tie plates maybe utilized.

Figure 25:
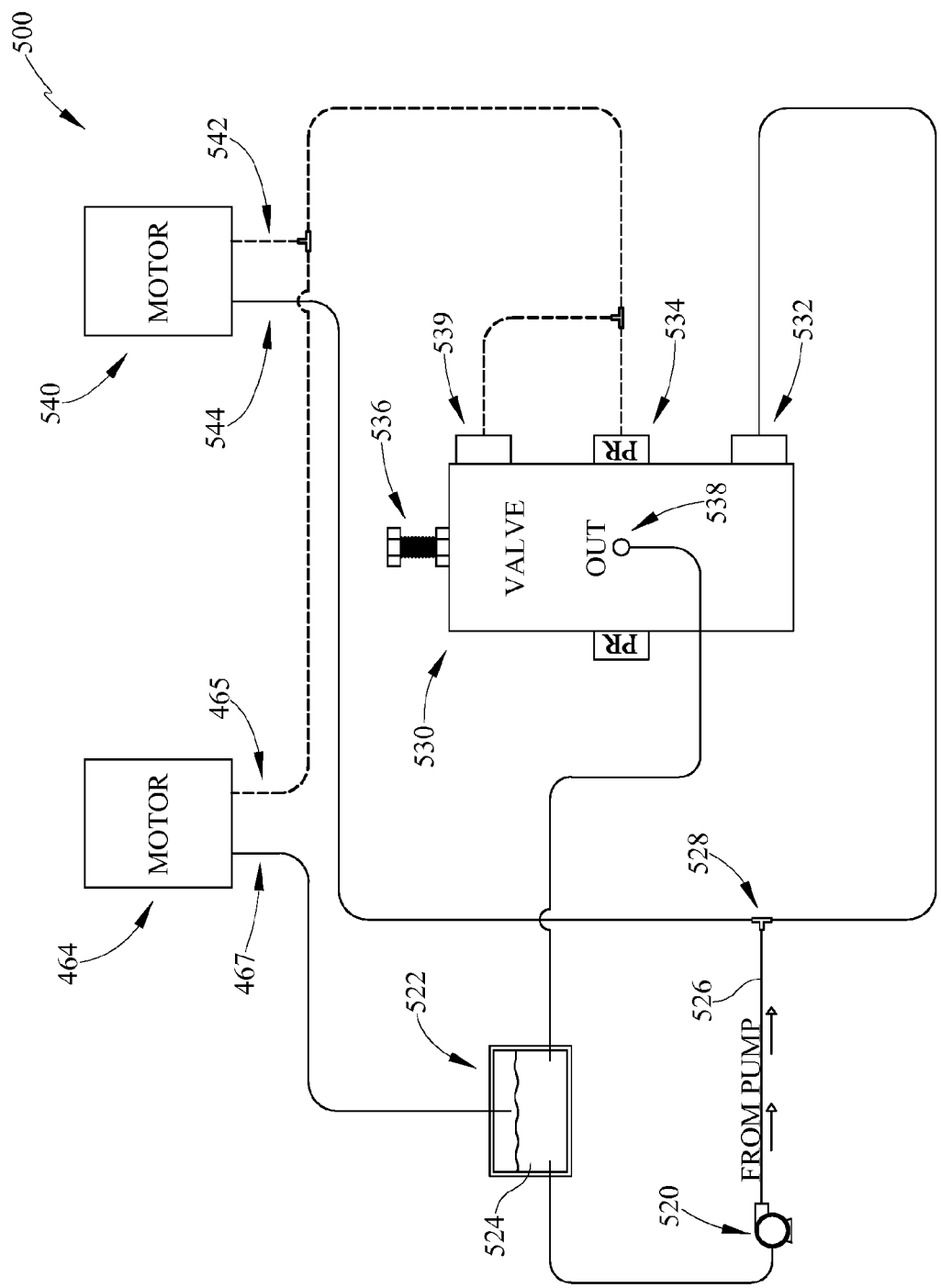
FIG. 25 is a schematic view of an exemplary control system.

Referring now to FIG. 25, a schematic view of the exemplary hydraulic system for operation of receiver 430 is depicted. The system utilizes a pump 520 in fluid communication with a reservoir 522 which contains a hydraulic fluid 524. The pump 520 directs fluid through a line 526 and reaches a T-joint 528 which directs fluid in two directions. First, the fluid is directed to a port 532 in a pressure regulating valve 530. In a second direction, fluid is directed to a receiver motor 540 input in order to drive the motor with for example hydraulic power. The receiver motor 540 has an output or return line 542 which also T's to direct fluid in two directions. In a first direction, the fluid is directed to the valve 530 port 534. Within the regulator valve 530, the valve may be set by rotation of an adjustment mechanism 536 to perform in two different manners. Above a pre-selected pressure, the hydraulic fluid will be directed out of the valve 530 through an outflow port 538 to the reservoir. A third valve port 539 is in fluid communication and extends with the line 534 from the receiver motor. In a second direction, the hydraulic line from the motor 540 feeds the conveyor motor 464 driving the tie plate feed system 460, which feeds the tie plates 16 into the receiver 430. The conveyer feed motor 464 includes an inlet 465 and a return 467 such that the return port feeds to the reservoir 522.

In operation, as the pump 520 directs hydraulic fluid 524 to the receiver drum motor 540 inlet 544, fluid is received at the first port 532 of the regulator valve 530. By comparing pressure from the return port outlet side 542 of the receiver motor 540 feeding the second port 534 of the regulator valve 530 with the pressure feeding the first port 532 of the regulator valve 530, a pressure reading is taken on a gauge and the adjustment mechanism may be adjusted to a pre-selected operating pressure or differential. If the operating pressure exceeds such pre-selected value, the valve 530 will direct fluid to the outlet port 538 and to the reservoir 524. If the pressure is below the pre-selected value, the line at port 539 will sense the pressure forcing fluid at the return line 542 to move from the drum motor 540 to the conveyor feed motor 464. This will drive the conveyer feed system 460.

The pre-selected pressure is derived from testing and if the pressure exceeds the pre-selected value, the schematic figure depicts that the conveyor feed motor 464 will not operate. Typically, when the pressure at the regulator valve 530 is exceeded, the receiver 430 contains too many tie plates 16. Thus by stopping the feed motor 464, the tie plates 16 may be sorted and exit the receiver 430. Once the number of tie plates decreases, the pressure at the regulator valve 530 decreases below the pre-selected value and the conveyor feed motor begins operating again. Although the components described herein are hydraulic in nature, other fluid systems may be used or electrical systems may also be utilized. For example, an electrical system may be utilized which compares current values on a drum motor to stop or start the conveyor feed motor. As a further alternative, a combination of fluid and electric systems may be utilized.

Figure 26:
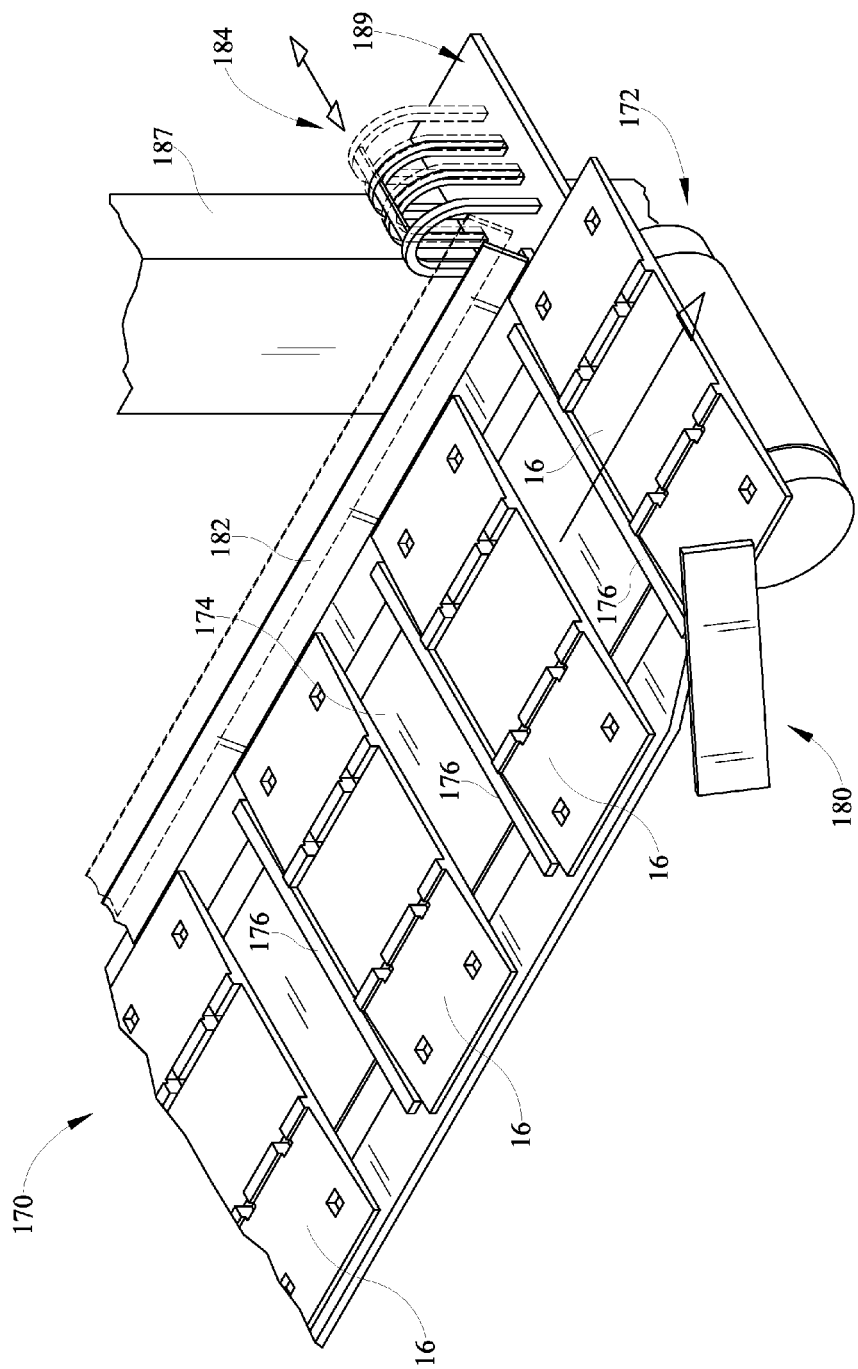
FIG. 26 is a perspective view of one embodiment of a conveyor with an adjustable guide wall.

Referring now to FIG. 26, a perspective view of the output conveyor 70 is shown in part. The conveyor 70 has a head end 172 and a tail end (not shown) and may be driven electronically or hydraulically for example. A belt or chain structure extends between the head end and tail end of the conveyor 70. In the case of a conveyor belt 174 may be formed of rubber or rubber-like material. The belt 174 further comprises a plurality of cleats 176 which extend across the belt 174 transverse to the longitudinal direction of the conveyor 70. The cleats 176 align the tie plates 16 properly for movement on the conveyor 70 and for improved transfer to further belts in a distribution system. It is desirable that the tie plates 16 be oriented in a manner for correct alignment with any subsequent tie plate distribution conveyor. The tie plates 16 are engaged by cleats 176 and moved to the feed and or output end of the conveyor 70.

Additionally, the tie plates 16 should be centered or positioned laterally in desired position with respect to the instant figure and conveyor 70. Accordingly, at least one guide wall 180 is utilized to move the tie plates 16 to a desirable location laterally along the conveyor belt 174. According to alternate embodiments, the conveyor 70 has guide walls 180, 182 wherein one of the guide walls is moveable between a first position and a second position relative to the longitudinal centerline of the conveyor 70. According to the instant embodiment, the guide wall 182 is moveable between a first position shown in broken line and a second position shown in solid line. In one position, the tie plates are guided to the center of the conveyor belt 174. However, in the instance where a tie plate is oversized, for example if a sixteen inch plate is accidentally included with a group of fourteen inch plates, a fixed sidewall would stop the tie plates 16 while they are continually driven forward on the belt 174. The guide wall 182 will however move outwardly to a second position allowing the oversized tie plate to pass to a location where it can be removed either automatically or by a worker on the machine.

The instant embodiment utilizes a magnet 184 which engages a frame element. The frame element may be either of the column 187 or the adjacent base 189 or alternatively may be other magnetizable component of the conveyor frame for example. The magnet has sufficient force to maintain the guide wall at the first inward position. As the tie plates 16 pass, the guide wall forces the tie plates to the center of the belt 174 without the magnet yielding to forces from the correctly sized tie plate. The guide wall 182 thus stays in position. However, when the guide wall 182 engages the exemplary oversized plate, the guide wall 182 cannot stay in its inward position and the magnet 184 slides outward allowing the guide wall 182 to move and the oversized tie plate to pass. Thus the instant embodiment allows the oversized tie plates 16 to pass while still centering the desirable sized tie plates during a tie plate distribution process. This embodiment of the magnet is exemplary as a biased guide wall may also be utilized to maintain the guide wall in an inward position while giving way when an oversized plate moves through the conveyor 70. Still other embodiments may be used to resist and only allow guided movement of the guide wall 182 between positions.

Figure 27:
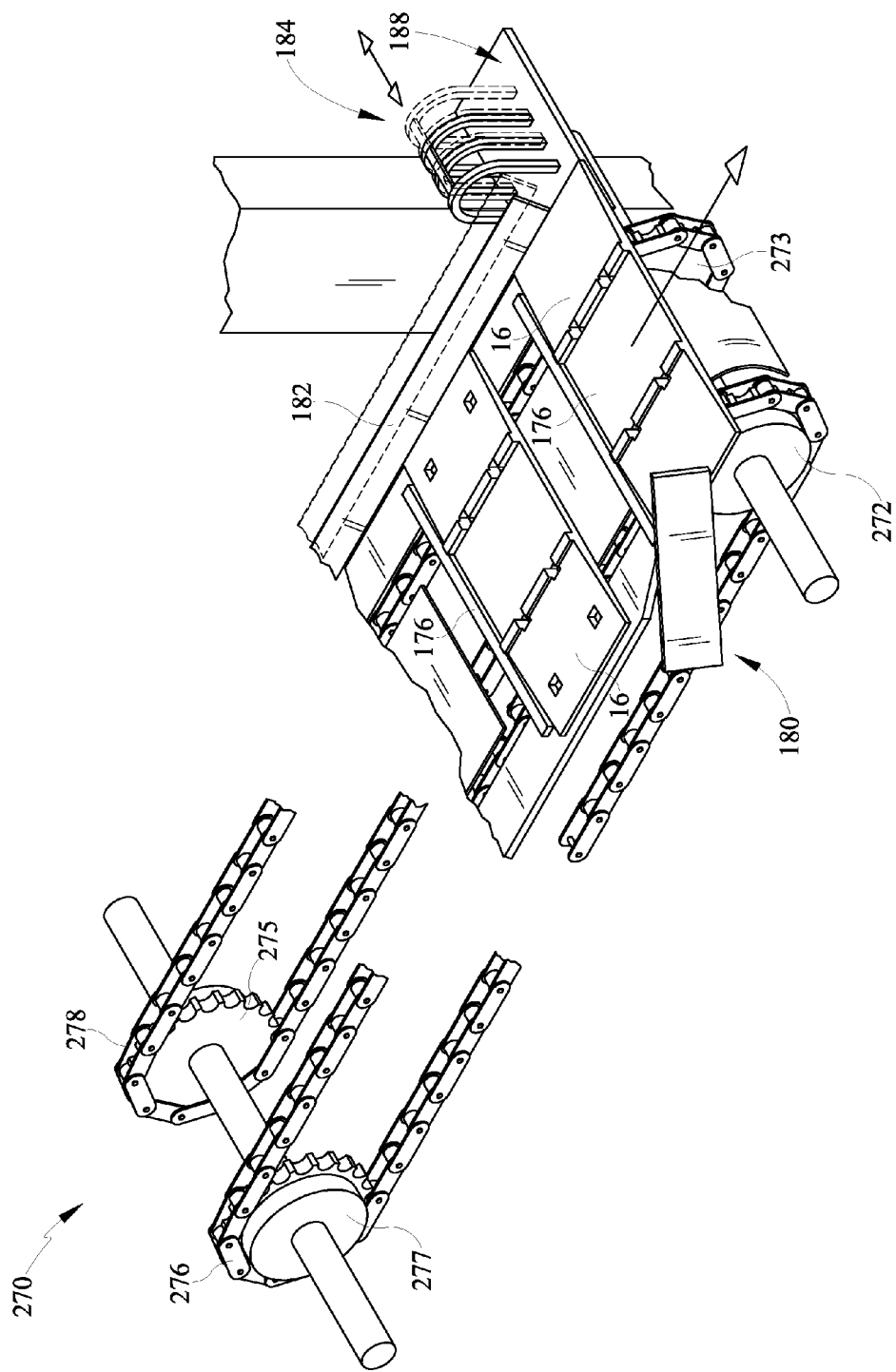
FIG. 27 is a perspective view of an alternate embodiment of a conveyor with an adjustable guide wall.

With reference now to FIG. 27, a perspective view of an alternative conveyor 270 is depicted. The conveyor comprises an alternate form to that of the previously described conveyor 70. As opposed to the conveyor belt 174 of FIG. 26, the conveyor 270 may include a chain drive system comprising at least one first head sprocket 272 and at least one second tail sprocket 277. At least one chain 276 may extend between the head and tail sprockets 272, 277. According to the exemplary embodiment, two parallel chains 276, 278 are utilized therefore requiring a first head sprocket 272 and second head sprocket 273 along with corresponding first tail sprocket 277 and second tail sprocket 275. Chains 276, 278 are utilized to extend between each of the head and tail sprocket pairs. Further, cleats 176 extend between the parallel chains and are spaced apart in the direction of the movement of the conveyor 270 between head end and tail end. Thus as at least one chain is driven, the cleats 176 move forward causing the tie plates 16 deposited between the spaced apart cleats 176.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A system for controlling a tie plate feed assembly, comprising:
 a fluid reservoir;
 a pump in fluid communication with said reservoir, a regulator valve, a receiver motor and a mover motor;
 said valve being adjustable to a preselected pressure;
 wherein above said preselected pressure, said mover motor is inhibited from operating;
 wherein below said preselected pressure, said mover motor drives a mover to move railroad components into a rotatable receiver which sorts railroad components.

2. The system of claim 1, said fluid reservoir being a hydraulic fluid reservoir.

3. The system of claim 1 said mover being a conveyor.

4. The system of claim 1, further comprising a hopper.

5. The system of claim 1, said valve being an adjustable regulator valve.

6. The system of claim 1 wherein said valve controls feeding of railroad components to a receiver.

7. The system of claim 1 wherein fluid pressure increases above said preselected pressure when said receiver is overloaded.

8. The system of claim 1 wherein fluid pressure decreases below said preselected pressure when said receiver has too few tie plates.

* * * * *